(12) United States Patent
Simpkinson et al.

(10) Patent No.: US 11,195,336 B2
(45) Date of Patent: Dec. 7, 2021

(54) FRAMEWORK FOR AUGMENTED REALITY APPLICATIONS

(71) Applicant: Vulcan Inc., Seattle, WA (US)

(72) Inventors: Richard Earl Simpkinson, Issaquah, WA (US); Richard Ignacio Zaragoza, Issaquah, WA (US); Keith Rosema, Seattle, WA (US); Alan Caplan, Seattle, WA (US); Paul G. Allen, Mercer Island, WA (US)

(73) Assignee: Vulcan Inc., Seattle, WA (US)

( * ) Notice: Subject to any disclaimer, the term of this patent is extended or adjusted under 35 U.S.C. 154(b) by 0 days.

(21) Appl. No.: 16/386,213

(22) Filed: Apr. 16, 2019

(65) Prior Publication Data

US 2019/0377757 A1 Dec. 12, 2019

Related U.S. Application Data

(60) Provisional application No. 62/682,761, filed on Jun. 8, 2018.

(51) Int. Cl.
| | |
|---|---|
| *G06T 19/00* | (2011.01) |
| *G06F 16/909* | (2019.01) |
| *G06T 19/20* | (2011.01) |
| *G06F 3/01* | (2006.01) |
| *G06F 3/0481* | (2013.01) |
| *G06K 9/00* | (2006.01) |
| *H04L 29/06* | (2006.01) |

(52) U.S. Cl.
CPC ............ *G06T 19/006* (2013.01); *G06F 3/011* (2013.01); *G06F 3/04815* (2013.01); *G06F 16/909* (2019.01); *G06K 9/00671* (2013.01); *G06T 19/20* (2013.01); *H04L 67/38* (2013.01); *G06T 2200/04* (2013.01); *G06T 2200/08* (2013.01); *G06T 2200/24* (2013.01)

(58) Field of Classification Search
CPC ..... H04L 67/38; G06K 9/00671; G06F 3/011; G06F 3/04815; G06F 16/909; G06T 19/006; G06T 19/20; G06T 2200/04; G06T 2200/08; G06T 2200/24
USPC .................................................. 345/619, 633
See application file for complete search history.

(56) References Cited

U.S. PATENT DOCUMENTS

| | | | |
|---|---|---|---|
| 6,396,497 B1 | 5/2002 | Reichlen | |
| 8,046,719 B2 | 10/2011 | Skourup et al. | |

(Continued)

OTHER PUBLICATIONS

International Invitation to Pay Additional Fees dated Aug. 26, 2019, Patent Application No. PCT/US2019/036181, filed Jun. 7, 2019, 21 pages.

(Continued)

*Primary Examiner* — Jacinta M Crawford

(74) *Attorney, Agent, or Firm* — Davis Wright Tremaine LLP

(57) ABSTRACT

An augmented reality system associates a plurality of services with an augmented reality application that is executing on an augmented reality device. The system receives sensor data obtained by the augmented reality device, and causes the plurality of services to process the data. The system generates an event based on the processing of the received data by the services, and sends the event to the augmented reality device. The augmented reality device generates an augmented reality display based at least in part on the event.

20 Claims, 14 Drawing Sheets

(56) References Cited

U.S. PATENT DOCUMENTS

| | | |
|---|---|---|
| 8,135,796 B1 | 3/2012 | Slaughter et al. |
| 8,643,951 B1 | 2/2014 | Wheeler et al. |
| 9,035,878 B1 | 5/2015 | Wheeler |
| 9,390,563 B2 | 7/2016 | Hart |
| 9,591,427 B1 | 3/2017 | Lyren et al. |
| 9,709,806 B2 | 7/2017 | Ishikawa et al. |
| 9,754,168 B1 | 9/2017 | Henderson |
| 9,916,431 B2 | 3/2018 | Hwang et al. |
| 10,281,987 B1 | 5/2019 | Yang et al. |
| 10,318,034 B1 | 6/2019 | Hauenstein et al. |
| 10,475,224 B2 | 11/2019 | Liang |
| 10,488,218 B2 | 11/2019 | Kim et al. |
| 10,504,288 B2 | 12/2019 | Piemonte et al. |
| 10,572,215 B1 * | 2/2020 | Cooper ................. G06F 3/16 |
| 10,585,294 B2 | 3/2020 | Youngstrom et al. |
| 10,649,212 B2 | 5/2020 | Burns et al. |
| 10,831,030 B2 | 11/2020 | Stellmach |
| 2003/0020707 A1 | 1/2003 | Kangas et al. |
| 2003/0140088 A1 | 7/2003 | Robinson et al. |
| 2006/0038833 A1 | 2/2006 | Mallinson et al. |
| 2006/0174037 A1 | 8/2006 | Bernardi et al. |
| 2010/0287485 A1 | 11/2010 | Bertolami et al. |
| 2011/0187746 A1 | 8/2011 | Suto et al. |
| 2011/0197161 A1 | 8/2011 | Mattingly et al. |
| 2011/0285704 A1 | 11/2011 | Takeda et al. |
| 2012/0075343 A1 | 3/2012 | Chen et al. |
| 2013/0212488 A1 | 8/2013 | Scherpa |
| 2013/0246967 A1 | 9/2013 | Wheeler et al. |
| 2013/0293490 A1 | 11/2013 | Ward et al. |
| 2013/0293580 A1 | 11/2013 | Spivack |
| 2014/0006631 A1 | 1/2014 | Meskauskas et al. |
| 2014/0055491 A1 | 2/2014 | Malamud et al. |
| 2014/0096215 A1 | 4/2014 | Hessler |
| 2014/0204117 A1 | 7/2014 | Kinnebrew et al. |
| 2014/0225814 A1 | 8/2014 | English et al. |
| 2014/0225918 A1 | 8/2014 | Mittal et al. |
| 2014/0267419 A1 | 9/2014 | Ballard et al. |
| 2014/0320389 A1 | 10/2014 | Scavezze et al. |
| 2015/0046296 A1 | 2/2015 | Hart |
| 2015/0153571 A1 | 6/2015 | Ballard et al. |
| 2015/0170256 A1 | 6/2015 | Pettyjohn et al. |
| 2015/0179186 A1 | 6/2015 | Swierk et al. |
| 2015/0199081 A1 | 7/2015 | Wheeler |
| 2015/0205106 A1 | 7/2015 | Norden |
| 2015/0206321 A1 | 7/2015 | Scavezze et al. |
| 2015/0212703 A1 | 7/2015 | Luckett, Jr. et al. |
| 2015/0248783 A1 | 9/2015 | Fayle |
| 2015/0356787 A1 | 12/2015 | Abe et al. |
| 2016/0025982 A1 | 1/2016 | Sutherland et al. |
| 2016/0026242 A1 | 1/2016 | Burns et al. |
| 2016/0071320 A1 | 3/2016 | Smith |
| 2016/0116995 A1 | 4/2016 | Wilson et al. |
| 2016/0132189 A1 | 5/2016 | Choi et al. |
| 2016/0212138 A1 | 7/2016 | Lehane |
| 2016/0239252 A1 | 8/2016 | Nakagawa et al. |
| 2016/0240011 A1 | 8/2016 | Fedosov et al. |
| 2017/0068416 A1 | 3/2017 | Li |
| 2017/0123504 A1 | 5/2017 | Kim et al. |
| 2017/0236320 A1 | 8/2017 | Gribetz et al. |
| 2017/0256096 A1 | 9/2017 | Faaborg et al. |
| 2017/0312032 A1 | 11/2017 | Amanatullah et al. |
| 2017/0323158 A1 | 11/2017 | Gordon |
| 2017/0324841 A1 | 11/2017 | Clement et al. |
| 2017/0336882 A1 | 11/2017 | Tome et al. |
| 2017/0337745 A1 | 11/2017 | Martin |
| 2018/0046352 A1 | 2/2018 | Johnson et al. |
| 2018/0066956 A1 | 3/2018 | Kim et al. |
| 2018/0150892 A1 | 5/2018 | Waldron et al. |
| 2018/0150899 A1 | 5/2018 | Waldron et al. |
| 2018/0150903 A1 | 5/2018 | Waldron et al. |
| 2018/0181810 A1 | 6/2018 | Jhawar et al. |
| 2018/0182142 A1 | 6/2018 | Lim et al. |
| 2018/0249274 A1 | 8/2018 | Lyren et al. |
| 2018/0314889 A1 | 11/2018 | Fukazawa et al. |
| 2018/0315248 A1 | 11/2018 | Bastov et al. |
| 2018/0322706 A1 | 11/2018 | Drouin et al. |
| 2018/0330515 A1 | 11/2018 | Stall et al. |
| 2018/0350144 A1 | 12/2018 | Rathod |
| 2019/0026874 A1 | 1/2019 | Jin et al. |
| 2019/0065027 A1 | 2/2019 | Hauenstein et al. |
| 2019/0073831 A1 | 3/2019 | Kim |
| 2019/0073832 A1 | 3/2019 | Kim |
| 2019/0082122 A1 | 3/2019 | Singh et al. |
| 2019/0087973 A1 | 3/2019 | Kaehler et al. |
| 2019/0099678 A1 | 4/2019 | Khan et al. |
| 2019/0108578 A1 | 4/2019 | Spivack et al. |
| 2019/0114051 A1 | 4/2019 | McBeth |
| 2019/0114052 A1 | 4/2019 | McBeth |
| 2019/0122440 A1 | 4/2019 | Barros et al. |
| 2019/0205645 A1 | 7/2019 | Bates et al. |
| 2019/0237044 A1 | 8/2019 | Day et al. |
| 2019/0310756 A1 | 10/2019 | Vathauer et al. |
| 2019/0310757 A1 | 10/2019 | Lee et al. |
| 2019/0339837 A1 | 11/2019 | Furtwangler |
| 2019/0339840 A1 | 11/2019 | Park et al. |
| 2019/0340816 A1 | 11/2019 | Rogers |
| 2019/0340818 A1 | 11/2019 | Furtwangler |
| 2019/0340833 A1 | 11/2019 | Furtwangler et al. |
| 2019/0342632 A1 | 11/2019 | DeFaria et al. |
| 2019/0347862 A1 | 11/2019 | Singh |
| 2019/0347865 A1 | 11/2019 | Hackett et al. |
| 2019/0354260 A1 | 11/2019 | Rosas et al. |
| 2019/0361521 A1 | 11/2019 | Stellmach et al. |
| 2019/0361797 A1 | 11/2019 | Yerli |
| 2019/0369716 A1 | 12/2019 | Chen et al. |
| 2020/0005026 A1 | 1/2020 | Andersen et al. |
| 2020/0012107 A1 | 1/2020 | Greenberg |
| 2020/0019295 A1 | 1/2020 | Spivack et al. |
| 2020/0035203 A1 | 1/2020 | Kosik et al. |
| 2020/0051338 A1 | 2/2020 | Zia et al. |
| 2020/0097068 A1 | 3/2020 | Hamidi-Rad et al. |
| 2020/0103962 A1 | 4/2020 | Burns |
| 2020/0111232 A1 | 4/2020 | Bleyer et al. |
| 2020/0111256 A1 | 4/2020 | Bleyer et al. |
| 2020/0117900 A1 | 4/2020 | Deng et al. |
| 2021/0019947 A1 | 1/2021 | Greunke et al. |

OTHER PUBLICATIONS

International Search Report and Written Opinion dated Oct. 10, 2019, Patent Application No. PCT/US2019/036182, filed Jun. 7, 2019, 15 pages.

International Search Report and Written Opinion dated Oct. 21, 2019, Patent Application No. PCT/US2019/036181, filed Jun. 7, 2019, 25 pages.

* cited by examiner

FRAMEWORK FOR AUGMENTED REALITY APPLICATIONS

CROSS-REFERENCE TO RELATED APPLICATIONS

This application claims the benefit of U.S. Provisional Patent Application No. 62/682,761, filed Jun. 8, 2018.

BACKGROUND

Augmented reality is a relatively new technology which involves incorporating computer-generated graphics into a view of a user's physical environment. Typically, augmented reality applications are performed with devices such as smartphones or goggles, which incorporate a camera for capturing an image of the user's physical environment, and a display for presenting the augmented view. The computing capacity of these devices is often limited.

BRIEF DESCRIPTION OF THE DRAWINGS

Various techniques will be described with reference to the drawings, in which.

DETAILED DESCRIPTION

Figure 1:
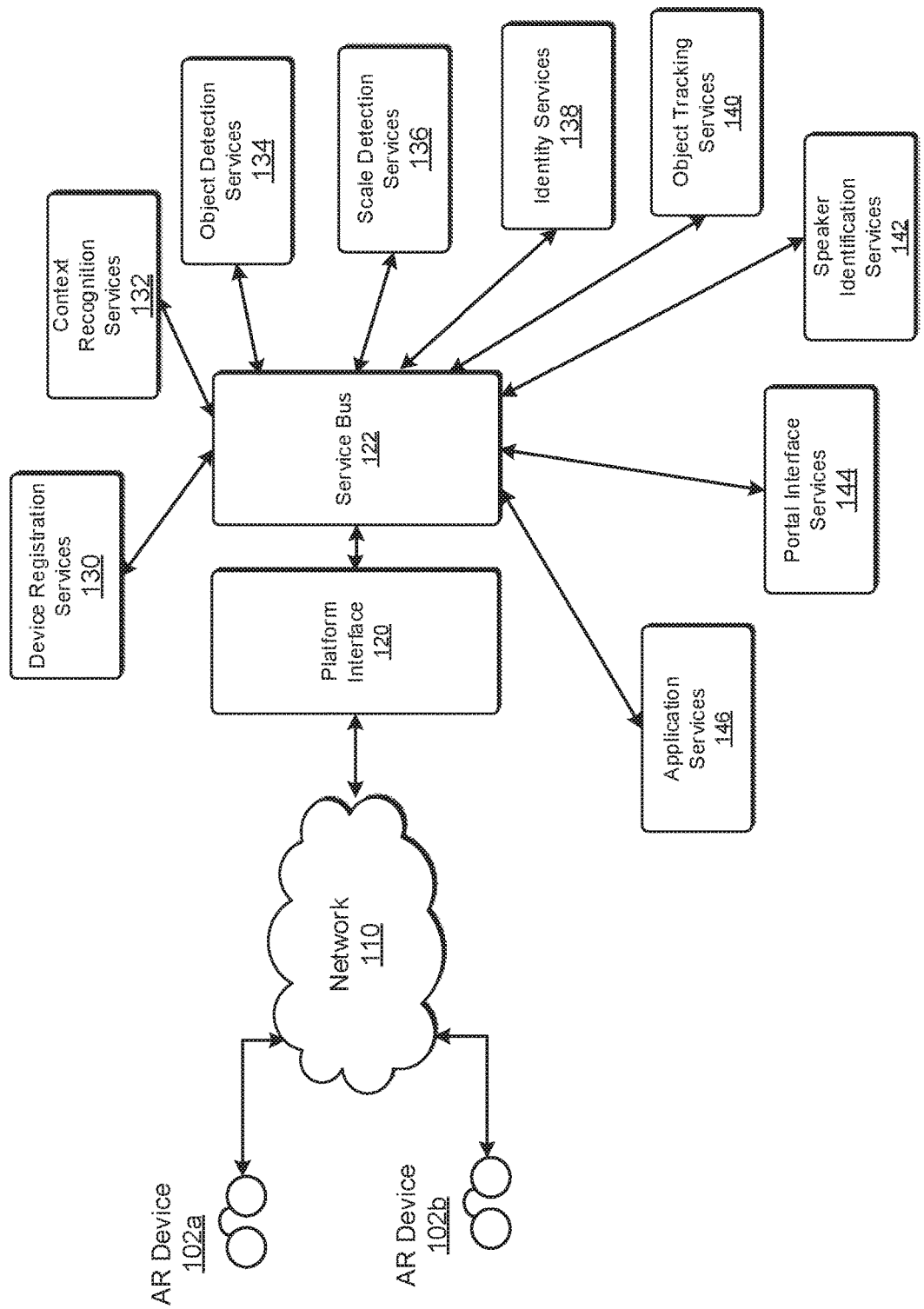
FIG. 1 illustrates an example of an augmented reality service platform, in accordance with an embodiment.

Techniques and systems described below relate to a platform and framework for executing augmented reality applications. In one example, an augmented reality framework facilitates execution of augmented reality applications on an augmented reality device. Data from the device is routed to hosted services which process the data and produce outputs which are routed back to the applications. The services include the projection and maintenance of a window or portal into the augmented reality space, the identification and management of interactions between people and objects, and speaker identification. The services process the data to identify events estimated to be relevant to the application, and sends the processed events to the augmented reality device. The augmented reality device generates audiovisual interface elements based on the events received from the services.

In another example, an augmented reality framework facilitates execution of augmented reality applications by providing services to maintain an association between an application and a portal associated with a point or region in a physical environment. In this example, a region of an augmented reality scene is identified. The region may correspond to a physical point in the space around the use of the augmented reality device that is capturing a view of the scene. The region is associated with an application. Sensor data from the augmented reality device is processed, and events are generated based on the sensor data. The events are provided to the application, which generates user interface elements that are displayed at positions defined relative to the identified region. In a further aspect of an example embodiment, the relevance of an event to an application is determined based on the event's proximity to the identified region.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As described herein, a scene refers to the visual aspects of the physical environment of the user of an augmented reality device. A scene therefore represents a physical environment. An augmented reality scene, in cases and embodiments, can include various augmentations of a scene, such as alterations or additions that provide information to the user of the device.

As used herein, a portal refers to a point or region of a scene that is associated with an application. For example, a portal may be associated with a point or region in the physical space around a user, although a portal might instead be associated with an artificial location, such as the foreground of the augmented reality scene. A portal's association with an application refers to the processing of events related to the application or to the specification and display of elements, in the augment reality scene, that are related to the application.

Techniques described and suggested in the present disclosure improve the field of computing, especially the field of augmented reality, by providing a framework for executing applications on an augmented reality device. Moreover, techniques described and suggested in the present disclosure are necessarily rooted in computer technology in order to overcome problems specifically arising in the technological field of augmented reality devices, such as the identification of observed objects, the placement of user interface elements within a moving augmented reality scene, and the determination of events relevant to an augmented reality application.

FIG. 1 illustrates an example of an augmented reality service platform 100, in accordance with an embodiment.

The platform 100 provides services 130-146 to augmented reality ("AR") devices 102, and in particular to applications that execute on a respective one of the AR devices 102. The services provided by the platform can include those related to portal management, session detection, knowledge sharing, and so forth.

In an embodiment, an AR device communicate with a platform interface 120 via a network 110. The communication comprises the transmission of sensor data obtained by the AR device and sent to the platform interface 120, and events generated by the operation of the service bus 122 and sent back, via the platform interface 120, to the AR device.

Examples of AR devices 102 include, but are not limited to, augmented reality headsets, goggles, glasses, smartphones, tablets, projectors, and so on. These devices may, in various embodiments, have limited computing capacity and operating system support. For example, such devices may lack support for multitasking. In particular, support for pre-emptive multitasking or concurrent execution of application threads may be limited on some of these devices.

In an embodiment, the AR devices 102 each comprise software modules that provide application launching and interface services, which may also be referred to as application services or portal services. The services may include those which facilitate interaction between application windows, or portals, on an AR device 102 and various services 130-146 hosted remotely.

Examples of the network 110 include, but are not limited, to the internet, wireless networks, ad hoc networks, optical-based networks, and so forth. These examples are intended to be illustrative, and as such should not be construed so as to limit the scope of the present disclosure to only those embodiments which include the specific example provided.

In an embodiment, the AR device obtains event-related data and streams the data to the platform interface 120. The data obtained by the device can include sensor data, such as visual data, audio data, infrared data, and so forth. The data can also include events (such as those related to user input) obtained by the AR device, or other information obtained or generated by the AR device. The platform interface 120 receives the stream of data from AR device and facilitates routing of the data to various services. A service bus 122, as depicted in FIG. 1, can route the data to the appropriate services for processing, and also route output from the services back to the AR device that generated the event.

A service bus 122 routes events and other data originating from the AR devices 102 to various services 130-144. The service bus 122, in an embodiment, employs a publish and subscribe model in which applications and services 130-146 register to receive sensor data from an AR device. The service bus 122 processes data received from an AR device, generate events based on the data, and route the generated events back to an application running on the AR device. The system may filter or selectively route events, so that an application only receives those events that are relevant to that particular application.

In various embodiments, the service bus 122 employs an iterative processing technique, in which data is processed by a given service multiple times, so that the processing may be improved based on insights made by other services. This iterative approach may be implemented using a publish and subscribe model. As an example of the iterative technique, object detection service 134 may form an initial estimate of an object's identity, but subscribe to the output of the scale detection services 136 so that it estimate of an object's identity can be refined once the size of the object, e.g. the object's dimensions in terms of height, width, and depth, have been determined.

The platform 100 can estimate the relevance of an event to an application in a number of ways. An application can provide indications of the types of events that the application wishes to process. For example, the application may subscribe to specific services, provide metadata describing the attributes of events to consider relevant, and so forth. The platform 100 can use the service bus 122 and its various services 130-146 to compare attributes of an event to those that the application has indicated to be relevant.

In an embodiment, the estimate of relevance is based on proximity of the event to a portal associated with the application. As described herein, a portal comprises a location projected into the three-dimensional space of the augmented reality scene. An event that is more proximate to a portal may be more relevant, in some cases, to the corresponding application than an event that is less proximate.

In an embodiment, the estimate of relevance is based on proximity and motion of an object, relative to the location of the portal. For example, when the path of an object is such that it is predicted to intersect with the location of the portal, an event related to the object may be considered more relevant than it would be for an object whose motion is away from and unlikely to intersect with the location of the portal.

In an embodiment, the estimate of relevance is based on a classification of an object associated with an event. For example the platform 100 might generate an event to note the existence of an object that has been identified in the augmented reality scene. The platform 100 might identify applications to which the object is relevant, based on various factors such as whether or not the application has registered an interest in that class of objects. If the identified object is a tree, for example, the platform might elect to send the message to a gardening application, but not to an application whose purpose is to help the user remember someone's name.

In an embodiment, an application launches on an AR device, such as one of the AR devices 102. The AR device transmits a message announcing the new application to the platform interface 120. The AR device also transmits messages indicating which services the launching application wishes to employ. The platform interface 120 then distributes, to the various services 130-146 via the service bus 122, information indicating that a new application is starting and an indication of which services the application is requesting. The services 130-146, if they are to be used by the application, may then subscribe to events of various types for that application, which may include categories, classifications, flags, and other data indicative of the desired event types. Upon receiving event-related data, a service may process the data and route a response back to the originating AR device and application, in the form of an event.

In an embodiment, the platform 100 comprises device registration services 130. The device registration services 130 may include services for enrolling the device into an augmented reality experience. For example, the services may include facilities for determining when an AR device is in the proximity of a location or thing that is associated with an augmented reality experience. For example, certain geographic locations such as stores, parks, and so forth may provide augmented reality experiences to users near those things. The registration services 130 may facilitate those experiences by providing information about device or user identity to the providers of such services.

In an embodiment, the platform 100 comprises context recognition services 132. These include services for improving identification and interaction with real world objects. For example, speaker identification may be improved by providing information about the context in which a voice is identified. The context recognition services 132 might therefore, for example, provide information about a user's meeting schedule to a speaker identification process. The identification process might, for example, be more efficient when performed in view of a list of attendees at a meeting the user is currently attending.

In an embodiment, the platform 100 comprises object detection services 134. These may provide capabilities related to detecting and identifying objects in an augmented reality scene. The object detection services 134 may, for example, employ various machine learning methods, database, and knowledge stores which enable the identification of objects observed in a scene.

In an embodiment, the platform 100 comprises scale detection services 136. These include services for determining the scale of objects visible in an augmented reality scene. The scale detection services 136 may, for example, employ various machine learning methods, database, and knowledge stores to determine the size of objects observed in a scene.

In an embodiment, the platform 100 comprises identity services 138. These services include those pertaining to the identification of particular people, places, or things. For example, identity services 138 might be able to provide the name of an individual observed in an augmented reality scene, the name of a landmark the user is viewing, or the name of a particular painting in a museum. Based on this information, applications can be provided with information uniquely identifying a person, place, or thing. Likewise, applications can be provided with information that classifies a person, place, or thing.

Note that the operation of the object detection services 134, scale detection services 136, and identity services 138 may be enhanced by the iterative technique described above. For example, the identification of a particular landmark may facilitate the determination of scale, since the size of an identified landmark may be known.

In an embodiment, the platform 100 comprises object tracking services 140. These services include those related to tracking a particular object as it moves, or as the viewpoint of the AR device changes. For example, object tracking services 140 might provide services indicating where a particular object was located in a prior video frame, where the same object is located in the current video frame, and where the same object is predicted to be in a subsequent frame.

In an embodiment, the platform 100 comprises speaker identification services 142. These services include those that help to associate recorded speech with the individual producing the speech.

In an embodiment, the platform 100 comprises portal interface services 144. These may include services for facilitating interaction with a window or portal on an AR device. Examples include, but are not limited to, services for positioning a display of data in an AR scene and adjusting the position of the display in space and time.

In an embodiment, the platform 100 comprises application services 146. These services may include providing abstracted representations of identified objects and their positions. For example, the application services might provide to an application a list of identified objects and information about the position and movement of those objects that is independent of the rotation and movement of the AR device user.

Figure 2:
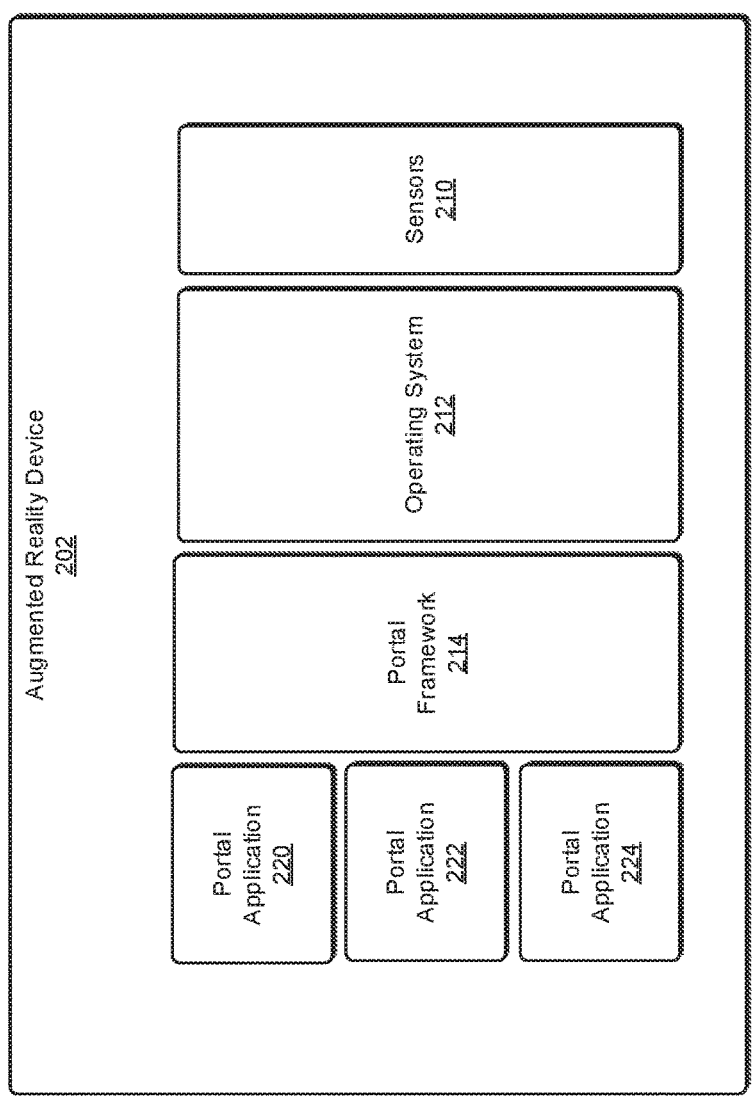
FIG. 2 illustrates an example of an augmented reality device, in accordance with an embodiment.

FIG. 2 illustrates an example 200 of an augmented reality device 202, in accordance with an embodiment. In an embodiment, the augmented reality device 202 comprises sensors 210, an operating system 212, and a portal framework 214. Various applications 220-224 execute on the AR device, assisted by the portal framework 214.

The sensors 210, in an embodiment, include cameras, microphones, global positioning system receivers, inertial sensors, gyroscopes, accelerometers, compasses, and so forth.

The operating system 212, in an embodiment, is a system that supports the basic functions of the augmented reality device, including but not limited to collecting and distributing data obtained from the sensors, operating a graphical output device, and other basic input/output capabilities. In addition, the operating system 212 may support application execution in some embodiments, the operating system 212 does not provide support for pre-emptive multitasking. In other embodiments, the operating system 212 does support pre-emptive multitasking.

The portal framework 214 provides support for executing portal applications 220-224. A portal application may also be described as an application, application instance, or application process. The support provided by the framework may include: 1) associating sensor input with applications; 2) providing abstract representations of sensor input to applications; 3) receiving output events from applications; 4) providing services to enable an application to subscribe to or otherwise benefit from remote services; 5) routing sensor data from applications to remote services; 6) routing events from remote services to applications; 7) adjusting for movements of object in space and time; 8) adjusting for rotation and movement of observer, and so on.

Each of the portal applications 220-224 may interact with the portal framework. In an embodiment, each portal application 220-224 implements an event distribution mechanism to receive events from the framework and process the events. The processing can include the generation of user interface elements. For example, an application might receive an event identifying a person observed in the augmented reality scene. In response, the application might generate a user interface element which displays information about the observed person at an appropriate location within the scene.

In an embodiment, the portal framework 214 and/or operating system 212 contains support for routing events for processing by the various portal applications 220-224. For example, the portal framework 214 and/or operating system 212 can receive an event and distribute it to the portal applications 220-224. Each of the portal applications 220-224 can implement callback functions or event loops for processing these events. When processing the events, the portal applications 220-224 can generate user interface elements. These elements can be defined relative to the portal, and may be hint-based instead of or in addition to being coordinate-based.

Figure 3:
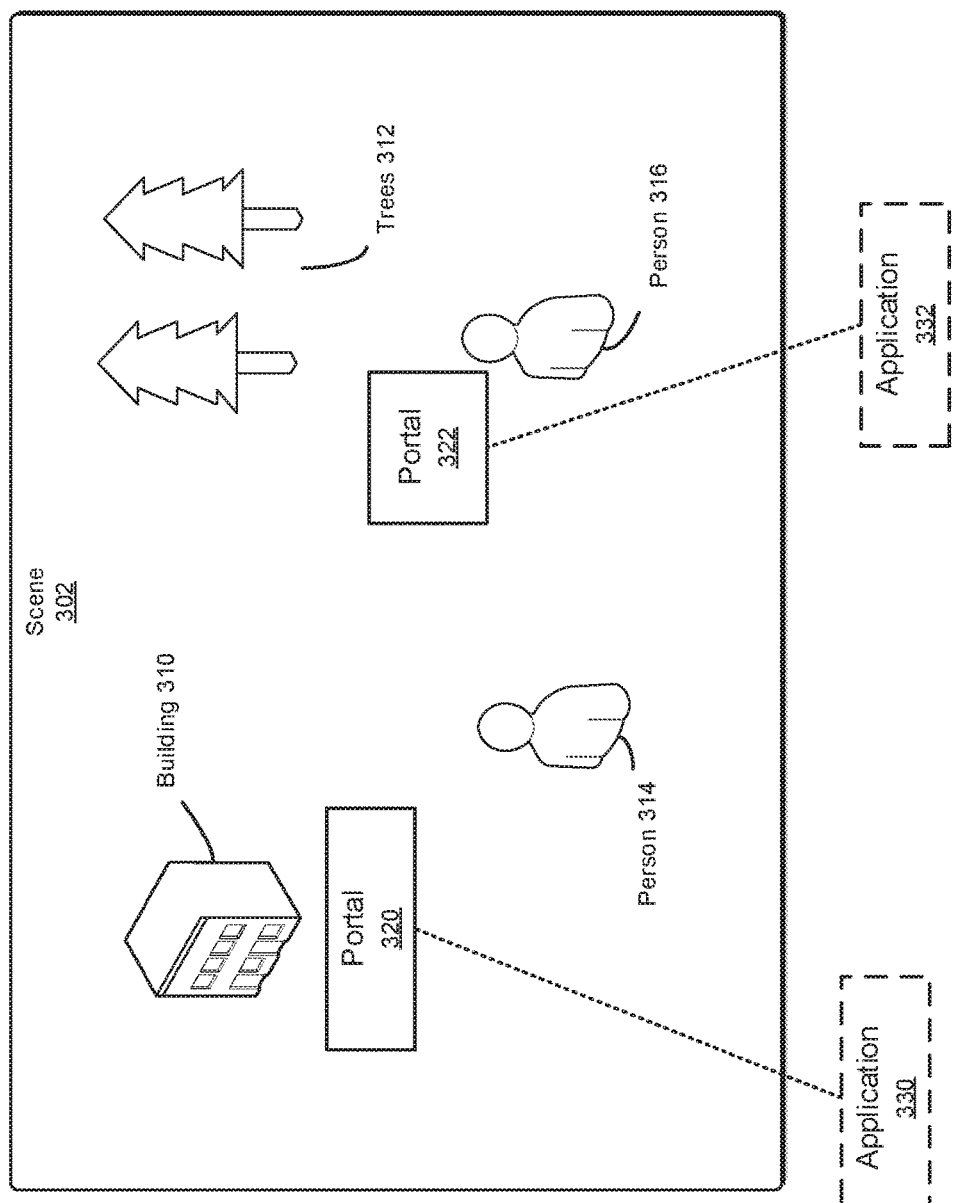
FIG. 3 illustrates aspects of operation of an augmented reality device, in accordance with an embodiment.

FIG. 3 illustrates an aspect of operation of an augmented reality device, in accordance with an embodiment. In the example 300, a scene 302 corresponds to an image captured by the camera of an augmented reality device. For example, the scene could be captured by a camera of the device depicted by FIG. 2. The scene may, in some cases, be recreated within the display of an augmented reality device. For illustrative purposes, this is presumed to be the case in the example of FIG. 3.

Note that the objects contained within the scene will typically move over time, as the user moves through space or changes the orientation of the augmented reality device and its camera(s). Moreover, the objects themselves may also move independently.

In the example 300, the video of the scene 302 captures various objects such as a building 310, trees 312, and persons 314, 316.

A portal is associated with a location or region projected by the system to a point, or set of points, in space. For example, two portals 320, 322 are projected into the space represented by the scene 302 illustrated by FIG. 3. In cases and embodiments, the portal is projected into a fixed region in space, such that its location in physical space stays constant even as the augmented reality device moves or is re-oriented. In other cases and embodiments, the portal is projected onto a region defined relative to an object. The region may be defined, for example, as being some fixed distance away from to the augmented reality device, for example, or defined relatively to an object observed in the scene. For example, a portal might be projected onto the space occupied by an observed person. As the person moves, the platform updates the portal location to reflect that movement.

A first application 330 running on the augmented reality device may be linked to a first portal 320. Similarly, a second application 332 may be linked to a second portal 322. Thus, portals may be associated with applications. In embodiments, the platform stores information associating applications with portals. For example, the platform may track locations projected into a three-dimensional space and track mappings between those locations and various applications.

An application 330 may receive information about events relevant to objects depicted within the scene 302. For example, a portal 320 might be linked to an object, such as a building 310. The system may detect that person 314 is approaching the building 310, and provide the application 330 with a notification.

In an embodiment, a portal 320 is associated with selected objects within a scene. For example, the portal 320 might be defined as being anchored to or encompassing the building 310. The portal 320 might also be associated with attributes or hints that suggest what events are relevant to it or to any applications linked to it.

More generally, a portal can be projected into a region of space. The region can be indicated by the application in various ways. These can include spatial indications, such as near an identified object, encompassing and identified object, and so on. Categorical and classification-based indications may also be used. For example, an application might define a portal by indicating a type of object, or an identity of an object.

Thus, in various embodiments, data generated by an AR device is sent to one or more remote services for processing. The remote services analyze the data to identify salient features (such as objects or actions) in the environment and generates events to represent these features. The services also determine which applications the events are relevant, and then send the events to those applications for processing. In embodiments, the relevance determination is based on factors including the proximity of the event to the portal, the type of event, and the event types that the application has indicated an interest in.

The platform, including the applications, can leverage the portals in a number of ways. In embodiments, applications define user interface elements relative to the portal. For example, an application might define a user interface elements using a coordinate system in which {0, 0, 0} is centered on the location of the portal. In another embodiment, an application might indicate where a user interface element should be displayed by providing a hint, such as "LEFT OF" or "RIGHT OF" the portal. These techniques permit the application to generate user interface elements and cause them to be displayed at an appropriate location within the augmented reality space, without requiring the application to account for factors such as movement or reorientation of the augmented reality device, or account for the motion of objects within the augmented reality scene.

In a further aspect, a portal 322 might be associated with an identified object. For example, the portal 322 might be linked to the identity of a person 316. In an embodiment, the system projects the portal 322 into space based on the position of the identified object, which in this example is the position of the person 316. The system, in various embodiments, updates the position as the person 316 moves.

In various instances, a graphical display is rendered based on the position of a portal 320, 322. For example, a window might be projected onto the location of the portal 322 in order to display information about the identified person 316. As noted above, an application might indicate where a user interface element should be displayed by providing hints regarding where the element should be displayed. An operating system or portal framework (such as those depicted in FIG. 2) can translate these hints to a location in the displayed scene.

Figure 4:
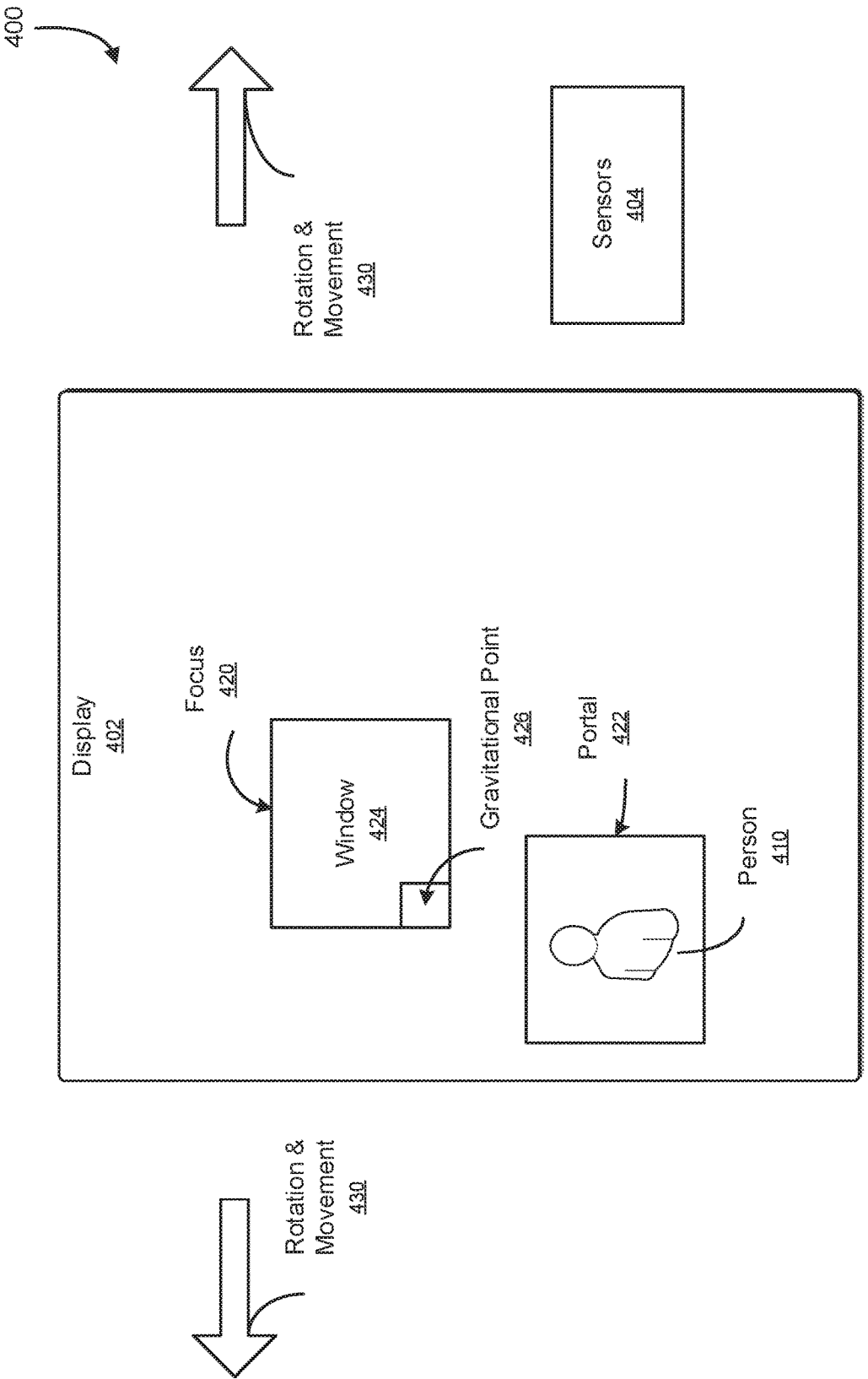
FIG. 4 illustrates additional aspects of operation of an augmented reality device, in accordance with an embodiment.

FIG. 4 illustrates an additional aspect of operation of an augmented reality device, in accordance with an embodiment. In particular, the example 400 of FIG. 4 depicts aspects of operating a user interface comprising a display 402 and sensors 404.

An augmented reality device comprising the display 402 and sensors 404 is subject to rotation and movement 430. The rotation and movement 430 may, in an embodiment, be captured by a camera and one or more of the sensors 404. For example, the sensors 404 may include accelerometers from which rotation and movement may be discerned.

Based on the detected movement, objects within the scene captured by the camera may be tracked. For example, the position of a person 410 within the scene may be tracked. In some instances, the tracking may continue beyond the scene boundary. Embodiments may also perform computations to predict future positions of objects, and estimate the likelihood of future events, such as collisions.

A portal 422 may be projected into the scene based, for example, on the position of an identified person 410 included within the scene. Note that the projection, in various embodiments, is over space and time. In other words, the portal may be projected into the scene at the current time, into predicted locations in the future, and/or into observed or estimated positions at prior times.

The current projections of the portal 422 may be used to maintain the user interface, and in particular to maintain the display 402. For example, the positioning of a window 424 may be based on the current position of the portal 422 into the scene space.

In an embodiment, various hints may be provided to assist in the positioning of the window 424. For example, a gravitational point 426 may be positioned as on offset of the location of the portal 422, and the window 424 location pinned or pulled to the location of the gravitational point

426. A user interface position may be specified in terms of this gravitational point. For example, a window of information about an object may be defined as being anchored to the gravitational point. The augmented reality device can then attempt to display the window at the gravitational point, but may automatically readjust the position based on the current scene. For example, if another object has moved into the region occupied by the gravitational point, the system may attempt to position the window as near as possible to the gravitational point 426 without obscuring the object. This might occur, in an embodiment, when this object is determined to be relevant to the application. However, if the object was determined to not be relevant, the window might be placed at the gravitational point 426 even though doing so would obscure the object.

The window 424 may be associated with a focus 420. The focus 420 represents and activation of the window 424 for certain inputs, such as user interface inputs. Certain non-user interface events may also be triggered by the window 424 gaining focus. For example, information about the identified person 410 might, in some cases, be provided to an application associated with the portal 422 only when the application's window 424 has acquired focus 420.

In an embodiment, focus 420 is controlled via input from the sensors 404. For example, a gaze sensor might determine that the user's vision is focused on the window 424. Focus 420 might also be controlled via a button, scroll wheel, or other input device, or via voice control. It will be appreciated that these examples are intended to be illustrative.

The projection of the portal 422 into past or future locations may, in some embodiments, be utilized to determine what events are routed to any applications associated with the portal. For example, if a portal is predicted to move within the space, range, or orbit of another object within a scene, the application associated with the portal might be provided with events relevant to this object, based on the predicted location of the portal 422.

Figure 5:
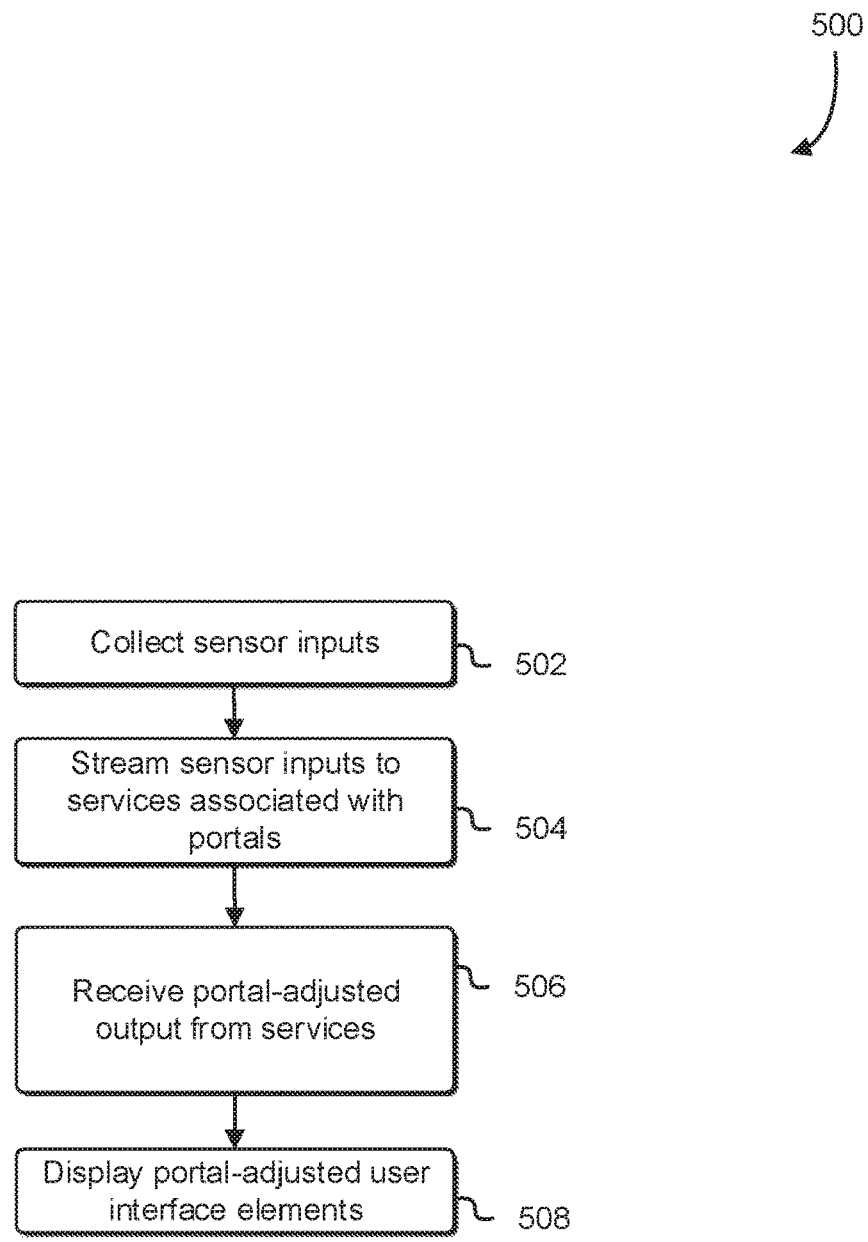
FIG. 5 is a flowchart that illustrates example operation of an augmented reality application framework, in accordance with an embodiment.

FIG. 5 is a flowchart that illustrates example operation of an augmented reality application framework, in accordance with an embodiment. Some or all of the process 500 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 500 may be performed by any suitable system, including but not limited to augmented reality devices comprising a processor and a non-transitory memory on which instructions executable by the processor are stored. The augmented reality device may further comprise components such as those depicted in FIG. 2. The process 500 includes a series of operations wherein an augmented reality device executes portal-based applications.

At 502, an augmented reality device collects sensor inputs. The sensor inputs may contain new frames from the device's primary camera(s), and may also comprise additional sensor input such as accelerometer data.

At 504, the augmented reality device streams the sensor inputs to remote services associated with the portals. In an embodiment, raw or condensed sensor input is streamed from the augmented reality device to remote services which perform filtering steps to determine which represent events that are relevant to a portal. Various transformation and augmentation steps may also be performed. Note that although a service bus may provide services with parallel access to event data, in certain cases the output of one service might feed into another, i.e. in serial fashion.

Certain portals, or their associated applications, or various associated services may be interested in some types of events but not interested in others. For example, some portals or applications may wish to receive accelerometer data, audio input data, and so on.

Certain portals, or their associated applications, or various associated services, may wish for remote services to process certain types of sensor data on their behalf, but do not need to or wish to receive the sensor data directly.

Certain portals, or their associated applications, or various associated services, may wish for input to be transformed or augmented in some way. For example, relative positions might need to be transformed to absolute positions.

Note that generally speaking, the majority of operations on sensor data occur remotely via hosted services, rather than on the augmented reality device.

At 506, the augmented reality device receives portal-adjusted output from the services. In other words, the augmented reality device receives events that have been adjusted to refer to elements of the scene in terms more convenient for use by the application. For example, the positions of objects in the scene might be represented relative to an origin that coincides with the center-point of the portal, or in abstract terms such as near or far, left or right, and so on. It will be appreciated that these example representations are intended to be illustrative rather than limiting.

At 508, the augmented reality device displays portal-adjusted user interface elements. In an embodiment, the system supports the use of hints to aid in displaying user interface elements. For example, an application might define anchor points or centers-of-gravity relative to the position of a portal, which may then be used to appropriately position a user interface element within a scene. For example, for a portal associated with an identified, in-scene, person, an application might define a center of gravity above the person that it uses to display "thought bubbles" above and to the right of the persons head. This is more convenient for the application, since it doesn't have to worry about precisely positioning the thought bubble on the display—the framework takes care of these details for the application.

Figure 6:
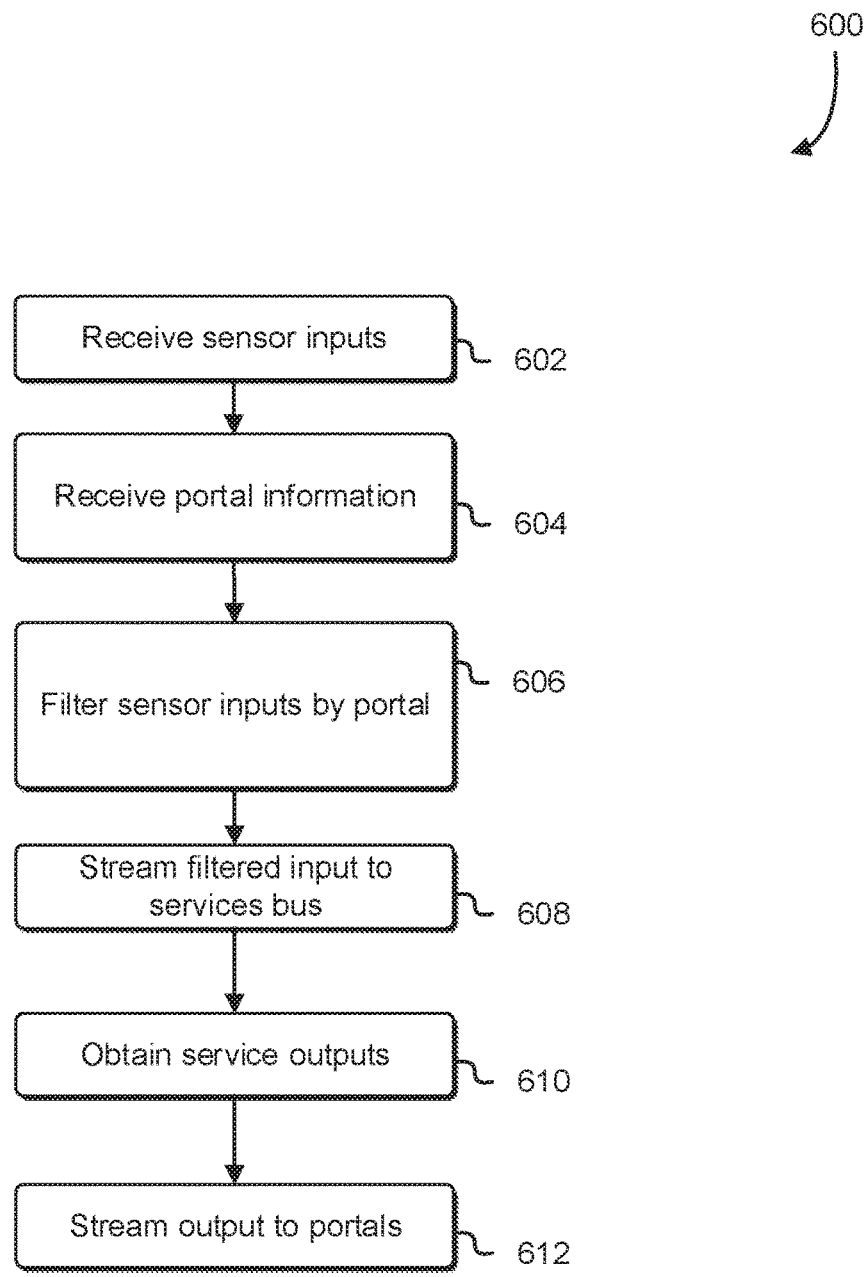
FIG. 6 is a flowchart that illustrates example operation of an augmented reality framework service, in accordance with an embodiment.

FIG. 6 is a flowchart that illustrates example operation of an augmented reality framework service, in accordance with an embodiment. Some or all of the process 500 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 14:
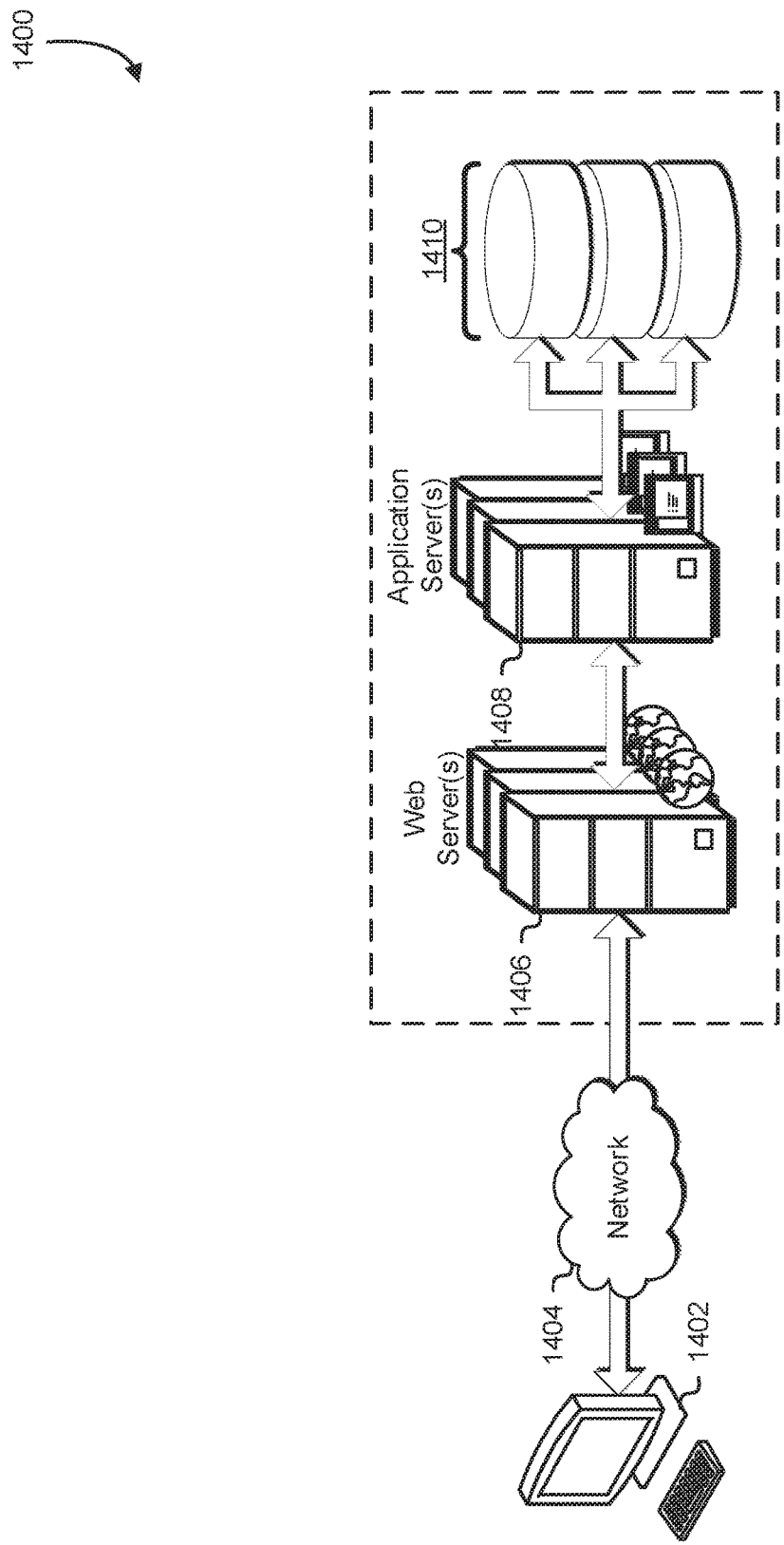
FIG. 14 illustrates an environment in which various embodiments can be implemented.

For example, some or all of process 600 may be performed by any suitable system, such as a server in a data center, by various components of the environment 1400 described in conjunction with FIG. 14, such as the one or more web servers 1406 or the one or more application servers 1408, by multiple computing devices in a distributed system of a computing resource service provider, or by any electronic client device such as the electronic client device 1402.

The process 600 includes a series of operations wherein a hosted framework for augmented reality receives and processes events from an augmented reality device.

At 602, the hosted framework receives sensor inputs from an augmented reality device. In an embodiment, the hosted framework receives a stream of video data from the augmented reality device, along with associated sensor input. Note that significant amounts of the data may be superfluous to the applications executing on the augmented reality device. The hosted framework may therefore perform filtering operations based on portals active on the device.

At 604, the hosted framework receives portal information. In an embodiment, this information comprises a list of active portals, such as those defined by applications running on the augmented reality device. The information may also include data indicating what types of events are relevant to the portal. Here, events referred to various conditions or occurrences, such as objects identified, movement of tracked objects, the emanation of audio, and so on.

In an embodiment, a portal is associated with a region, range, distance, or orbit within which events are considered relevant.

In an embodiment, a portal or an associated application is associated with a list of event types that are considered relevant.

In an embodiment, a portal is associated with time quantities that are indicative of which events are considered relevant to the portal. The time quantities may refer to past or future times. For example, a portal might be associated with properties that indicate that it should receive events relative to where an object had been located at a prior point in time, or where the object is predicted to be located at a future point in time.

In an embodiment, a portal is associated with attributes that indicate how predicted future positions of the portal are to influence received events. For example, a portal might be associated with attributes that indicate it should receive information about objects located within a predicted future location of the portal.

At 606, the hosted framework filters sensor inputs according to the portal information. The filter process may occur according to the various attributes and properties discussed above. In an embodiment, this stage also involves associating the events with whatever portals the events are relevant to.

At 608, the hosted framework streams the filtered input to the service bus. In an embodiment, this step proceeds as follows: 1) an event is tagged with the portal it has been deemed relevant to; 2) services that have been subscribed to events for that portal receive the event; 3) those services process the events.

At 610, the hosted framework obtains outputs from the services. Then, at 612, the hosted framework streams the output to the augmented reality device, where the output is distributed to the corresponding portal.

In various embodiments, support for augmented reality applications involves session detection and session management. Here, the term session refers to a period of interaction between objects or persons. Session detection and session management involves or is related to identifying the starting and ending of interactions, the participants in the interactions, and the provision and sharing of information related to the session.

Embodiments may perform session detection to improve various aspects of the operation of the platform. Session detection may be performed to identify the context in which various objects are observed, which may in turn improve the identification of events related to the various applications.

Figure 7:
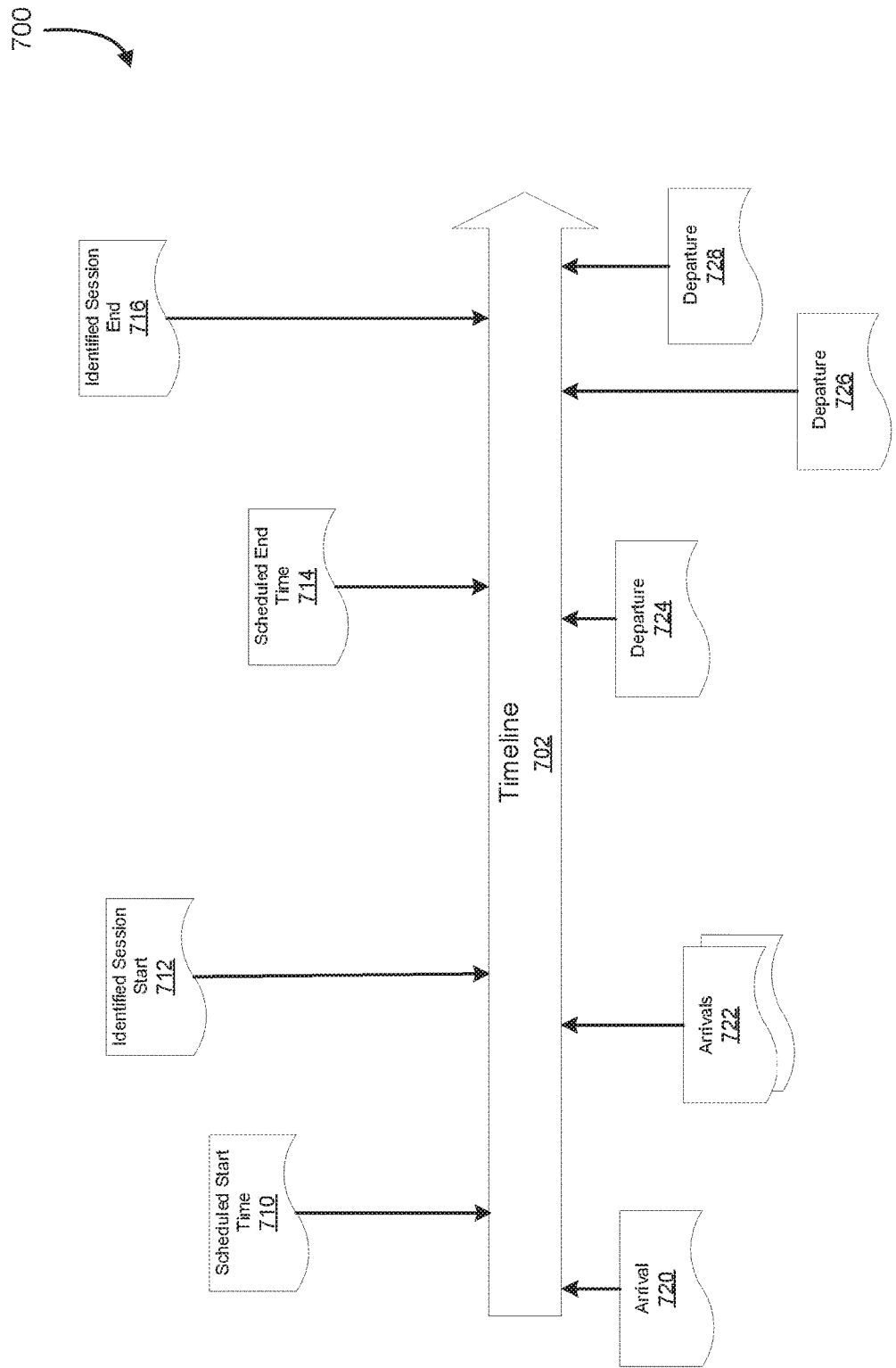
FIG. 7 illustrates an example of session detection, in accordance with an embodiment.

FIG. 7 illustrates an example of session detection, in accordance with an embodiment. Session detection may be performed, in an embodiment, by the platform 100 depicted in FIG. 1. Session detection may involve a variety of services acting in coordination, including object detection, face detection, identity detection, speaker identification, context recognition, and so forth. In an embodiment, an iterative approach is used, wherein each service contributes observations and values indicating the certainty of the observation. These observations may then be used to produce new observations associated with a greater level of certainty. This process may continue until a threshold level of certainty is reached. Note that here, the term "observation" refers to a fact, condition, state, or other quality that is believed to be true or factual as governed by an associated confidence level. For example, the identity of a participant may be described as an observation with an associated confidence level.

In the example of FIG. 7, session detection and management is performed in relation to a scheduled meeting. It will be appreciated that this example is intended to be illustrative, and as such should not be construed to limit the scope of the present disclosure to the provided example. In the example, the meeting occurs in a conference room or similar venue, and is observed by one or more augmented reality devices each comprising a range of sensors. It will be appreciated, however, that at least some of the disclosed techniques might also be applied to data collected from standalone sensors, such as a camera and microphone.

In the example 700, the meeting occurs over a timeline 702, with a scheduled start time 710 and a scheduled end time 714. In an embodiment, such as one implemented by the platform 100 depicted in FIG. 1, information about the start and end time is obtained by context recognition services 132.

Note, however, that it may be problematic to assume that the session starts and ends precisely at these times. For example, in FIG. 7 one participant's arrival 720 occurred prior to the scheduled start time 710, but no one else has arrived yet. Moreover, the early arriving participant might be conducting other business, such as conducting an unrelated phone call, while he or she waits for other participants to arrive. Alternatively, he or she might be reading email or otherwise be unengaged in any meeting-related activity. As such, it might be useful for the system to not associate any of these activities with the session. This may be the case even after the scheduled start time 710.

At a second arrival time 722, additional participants arrive and, after a brief chat about unrelated matters, begin a discussion relevant to the topic of the meeting. The platform may then determine that the session has started at a point 712 subsequent to the new arrivals. The determination may be based on a combination of factors, such as 1) the observation that the scheduled start time has already occurred, that 2) a quorum of individuals scheduled to attend the meeting have arrived, 3) sentiment analysis indicates a "serious" tone to the discussion topic, 4) content analysis indicates that subject matter relevant to the scheduled discussion topic is being discussed. As noted above, this process may be performed by an iterative analysis of observations and confidence levels associated with the analysis.

The platform 100 may employ a similar approach to identify when the session ends. For example, one of the participants may depart the meeting at a point 724 prior to the scheduled end time 714, but this does not necessarily indicate that the meeting has ended. Iterative analysis of observations may at this point detect, for example, that meeting related subjects are still being discussed, that a quorum of participants is still present, and so forth.

A similar analysis might determine that the session has ended at a subsequent point 716, following the scheduled end time 714, an additional departure 726 of a meeting participant, and the conclusion of various winding-down activities by the remaining participant. For example, the remaining participant 728 might conclude the meeting by taking notes, requesting snapshots of a whiteboard used in the meeting, and so forth. These would be included in the session, whereas subsequent activities by the remaining participant, like checking up on email or making an unrelated phone call, are determined to be irrelevant to the meeting and therefore indicative of an end to the meeting. The system may also incorporate various hard-stop features, such as those triggered by user input.

In various embodiments, knowledge and data associated with each participant is shared during the session. The shared knowledge may, for example, be used to improve augmented reality experience. This may, in some embodiments, include enhancing speaker identification and other session identification and management features. For example, the data held by a user might include voice recognition capabilities trained to that particular user. If this information is shared with other user devices, the overall voice-recognition capabilities available to each device are improved. Note, however, that the sharing, in various embodiments, occurs remotely rather than directly between devices.

In various embodiments, shared knowledge is used to improve the set of information that is available, which may in turn improve the identification of events and the determination of whether or not those events are relevant to an application. Embodiments may also employ session-based knowledge sharing to provide an application with more information, or more accurate information.

Figure 8:
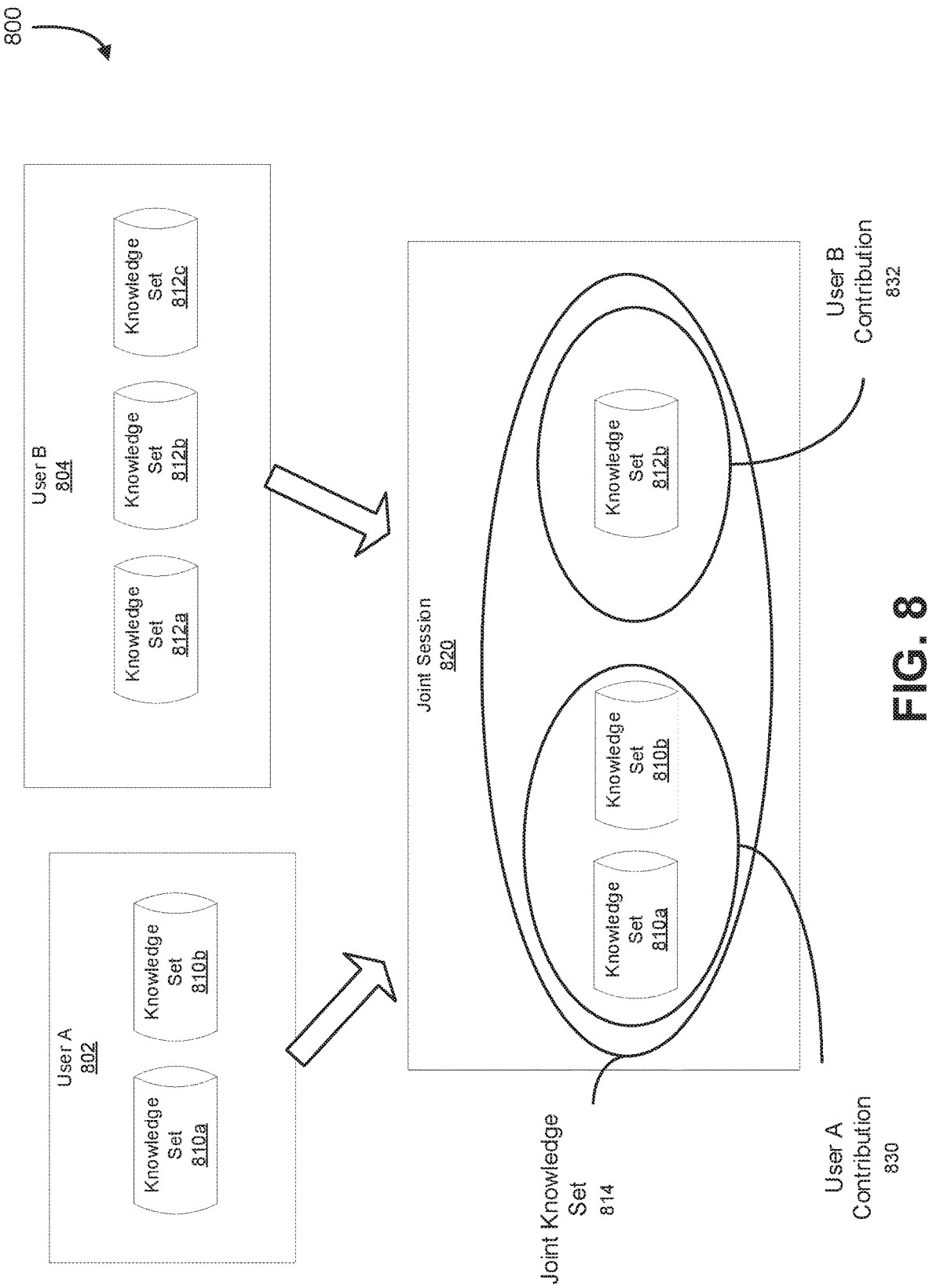
FIG. 8 illustrates an example of session-based knowledge sharing, in accordance with an embodiment.

FIG. 8 illustrates an example of session-based knowledge sharing, in accordance with an embodiment. It will be appreciated that this example is intended to be illustrative, and as such should not be construed to limit the scope of the present disclosure to the provided example. In the example of FIG. 8, a joint session 820 is identified involving User A 802 and User B 804. Each of the users 802, 804 may be associated with a knowledge set 810, 812. The knowledge sets 810, 812 may be selectively shared between devices. Note that in this context, sharing the data generally refers to making the data available to services operating on behalf of the various devices, rather than a literal interchange of data.

As depicted in FIG. 8, information from User A's 802 knowledge set 810 may be combined with information from User B's 802 knowledge set 804, to form a joint knowledge set 814 consisting of contributions 830 from User A and contributions 832 from User B.

The information shared between User A 802 and User B 804 may be limited by various factors. These include, for example, privacy, licensing, consent, non-disclosure agreements, legal regulations, information that has been identified as non-sharable, the participants in a session, and so forth. Care is exercised to ensure that the information shared is limited to that which the user has authorized to be shared and which it is legal or ethical to share. Where appropriate, the information is anonymized prior to sharing.

As noted, in various embodiments the information is not literally shared between devices, but rather authorized for use by services associated with each of the participants in a session.

In an embodiment, facial recognition data is made available to services operating on behalf of session participants.

In an embodiment, information about the attendees of a meeting (such as email address, phone numbers, scheduling information, and so forth) are made available to services operating on behalf of session participants.

In an embodiment, voice recognition data is made available to services operating on behalf of session participants.

Figure 9:
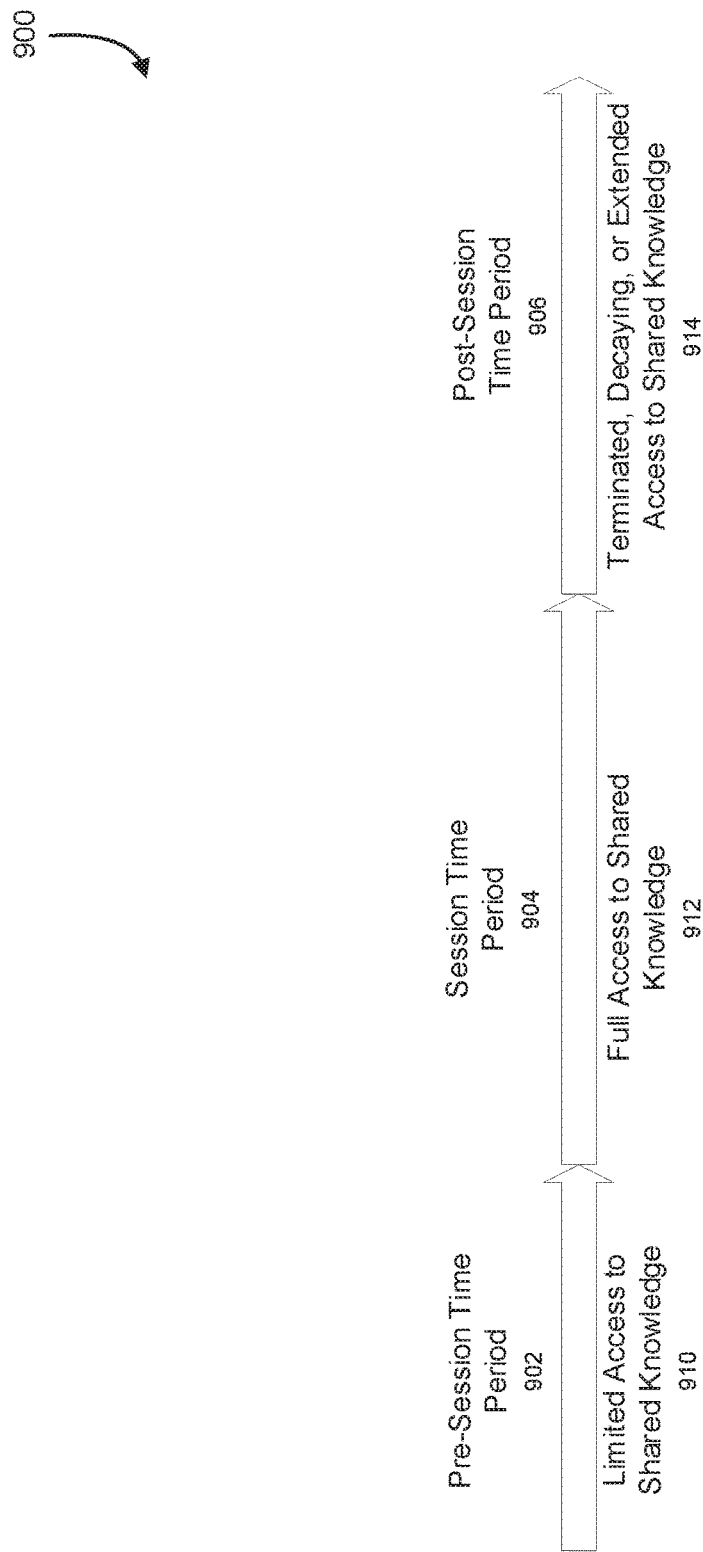
FIG. 9 illustrates example aspects of session-based knowledge sharing, in accordance with an embodiment.

In various embodiments, the information is shared between participants at varying levels before, during, or after a session. FIG. 9 illustrates example aspects of session-based knowledge sharing, in accordance with an embodiment. In the example, a timeline consists of a first period 902 prior to a session, a second period 904 during the session, and a third period 906 following the session.

In an embodiment, information is shared between session participants, or between hypothetical session participants. For example, selected information might be shared between the invitees to a meeting (or rather, shared between services operating on their behalf). This information, in an embodiment, includes contact information and scheduling information. In some embodiments, biographical information is shared. This may be defined as providing limited access 910 to shared knowledge.

In an embodiment, full access 912 is granted during the time period 904 in which the session is occurring. Note that "full access" does not refer to all available information. Rather, it refers to information that has been determined to be acceptable to share. For example, the full join knowledge set 814 depicted in FIG. 8 might be shared during this period, but information not included in this set is never shared. During the other time periods 902, 906, less than the full knowledge set 814 is shared.

In an embodiment, access to information is terminated, made to decay, or extended 914 during the period 906 following the session.

For example, in an embodiment, some information (such as contact information) is permanently shared between participants.

In an embodiment, access to some information is immediately terminated following the session.

In an embodiment, access to some information is extended for a limited period of time following the end of the session.

In an embodiment, access to the shared information decays over time. For example, a meeting participant's schedule might be made available immediately following a meeting, to allow for accurate scheduling of a follow-up meeting. However, after some time has elapsed, the available information might be reduced to information about times the participant is generally available.

Figure 10:
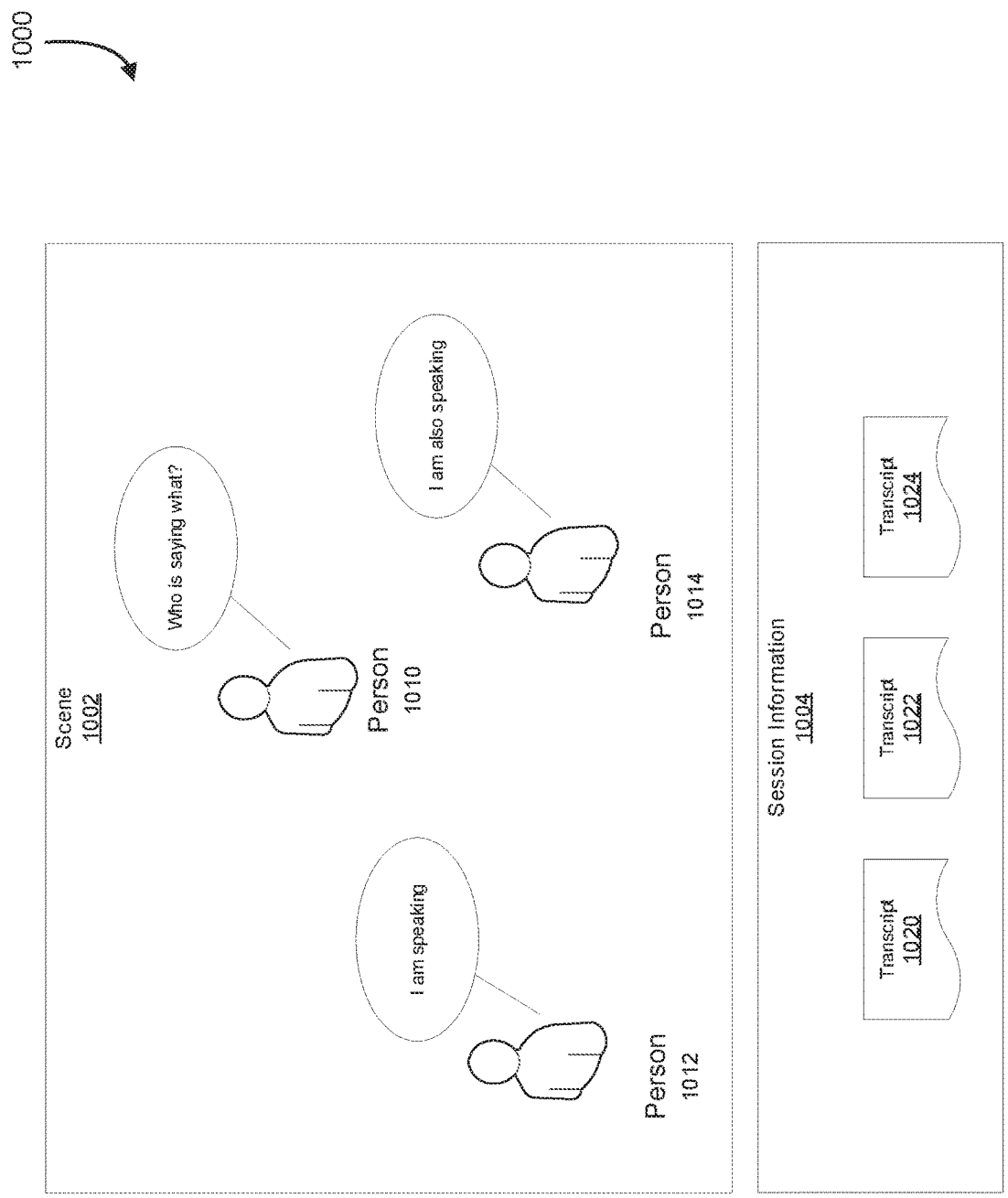
FIG. 10 illustrates aspects of speaker detection and identification, in accordance with an embodiment.

FIG. 10 illustrates aspects of speaker detection and identification, in accordance with an embodiment. Speaker detection services may, for example, be a component of a platform for augmented reality services, such as the platform 100 depicted in FIG. 1.

As illustrated by the example 1000 of FIG. 10, speaker detection may involve determining the identity of a speaker observed within an augmented reality scene 1002. The scene 1002 might, for example, comprise three persons 1010, 1012, 1014, each of which might be speaking at any given time—in some cases in turn, in others at the same time. In various embodiments, the augmented reality services platform 100, as depicted in FIG. 1, may provide services enabling the identification of each speaker. The services may further include a transcript facility, such that a transcript 1020, 1022, 1024 is generated for the comments made by each of the persons 1010, 1012, 1014. The system might also generate a single transcript containing attributed statements for each speaker.

Speaker detection capabilities may be leveraged, in various embodiments, to improve the identification of events relevant to an application, such as events transcribing the spoken words of an identified speaker determined to be relevant to a particular application. For example, speaker detection may be used to determine when someone proximate to the user of an augmented reality device, or proximate to a portal, has spoken.

Figure 11:
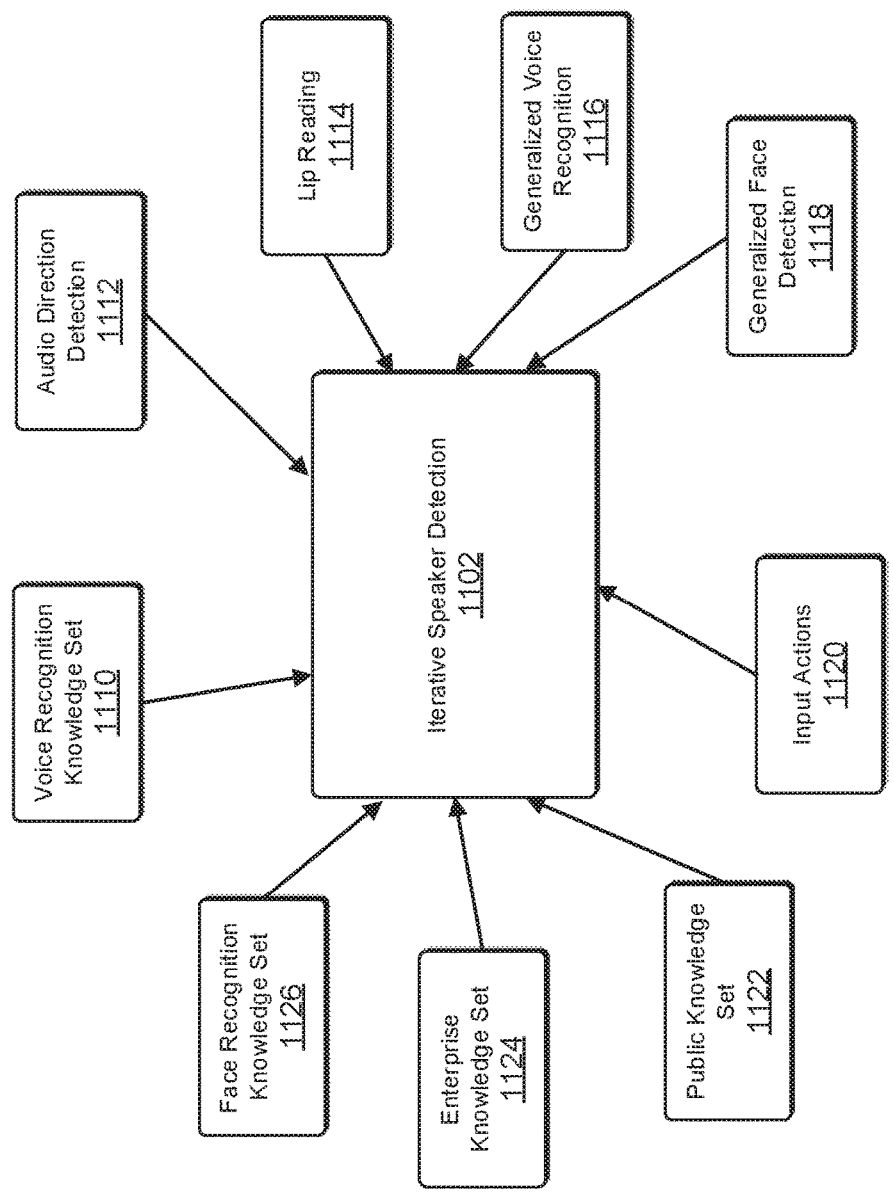
FIG. 11 illustrates aspects of operations for speaker detection and identification, in accordance with an embodiment.

FIG. 11 illustrates aspects of operations for speaker detection and identification, in accordance with an embodiment. In an embodiment, an iterative speaker detection module 1102 performs an iterative process for identifying a current speaker. A module, as used herein, refers to processor-executable instructions, at least some of which have been loaded into the memory of a computing device, that when executed by a processor of the computing device, cause the computing device to perform the described functions of the module.

In an embodiment, the operation of the iterative speaker detection module 1102 proceeds as follows: 1) visual information for a scene is captured; 2) audio information is captured; 3) the occurrence of speech is detected, though the content of the speech is not necessarily determined; 4) an initial estimate of the speaker is determined; 5) the estimate is refined until sufficient confidence is reached; and 6) the content of the speech is recorded.

In an embodiment, a generalized voice recognition module 1116 detects the occurrence of speech. The module is not specifically trained to recognize individual speakers, but rather to detect the occurrence of speech in an audio signal. In some instances, this function may be performed based in whole or in part on visual information, for example by a "lip reading" module 1114. Although such techniques may be relatively poor at determining the content of speech, they may be suitable for detecting the occurrence of speech, and have the advantage of providing high confidence regarding the person who is the source of the speech. Likewise, audio-based voice recognition algorithms may be selected based on their reliability and/or efficiency at detecting the occurrence of speech, rather than the content of speech.

In an embodiment, an audio direction detection module 1112 identifies the direction an audio signal is originating from. The module 1112 may base the identification on input from a stereo microphone, or alternatively from audio signals shared between augmented reality devices. The sharing may include sharing of data received by and stored remotely.

In an embodiment, a generalized face detection module 1118 detects faces within the captured visual information. This module may be selected based on its accuracy and efficiency in detecting the presence of a face, rather than its ability to identify a particular face. The presence of a face in the image can be correlated with other information, such as audio direction, to improve an estimate of speaker location.

Once an initial estimate of speaker location is generated, the iterative speaker detection module 1102 may attempt to associate an identity with the speaker. An enterprise knowledge set 1124 may provide information useful in assigning an identity to the speaker. This information can include personnel records usable for identity determination. For example, the record might include photographs of each employee. In some embodiments, a facial recognition system, such as an artificial neural network, may be pre-trained to identify employees by face, and this network included in the enterprise knowledge set. A public knowledge set 1122 may provide capabilities similar to that of the enterprise knowledge set, but using public data sources.

In some embodiments, a face recognition knowledge set 1126 may be used. This may include data for operating a neural network trained to recognize faces and associate the recognized face with an identity. This may include data for networks trained to identify particular faces, such as the face of the user from which the data is obtained.

Similar, in some embodiments, a voice recognition knowledge set 1110 may include data for operating voice recognition system, such as an artificial neural network trained to recognize voices. This may include data for networks trained to identify particular voices, such as the voice of the user from which the data is obtained.

Note that in many instances the data used by the modules depicted in FIG. 11 is obtained through knowledge sharing, such as the knowledge sharing depicted in FIG. 8. For example, during a session the facial recognition and voice recognition data for each participant might be shared, so that each participant's voice can be recognized using all of the available data.

Figure 12:
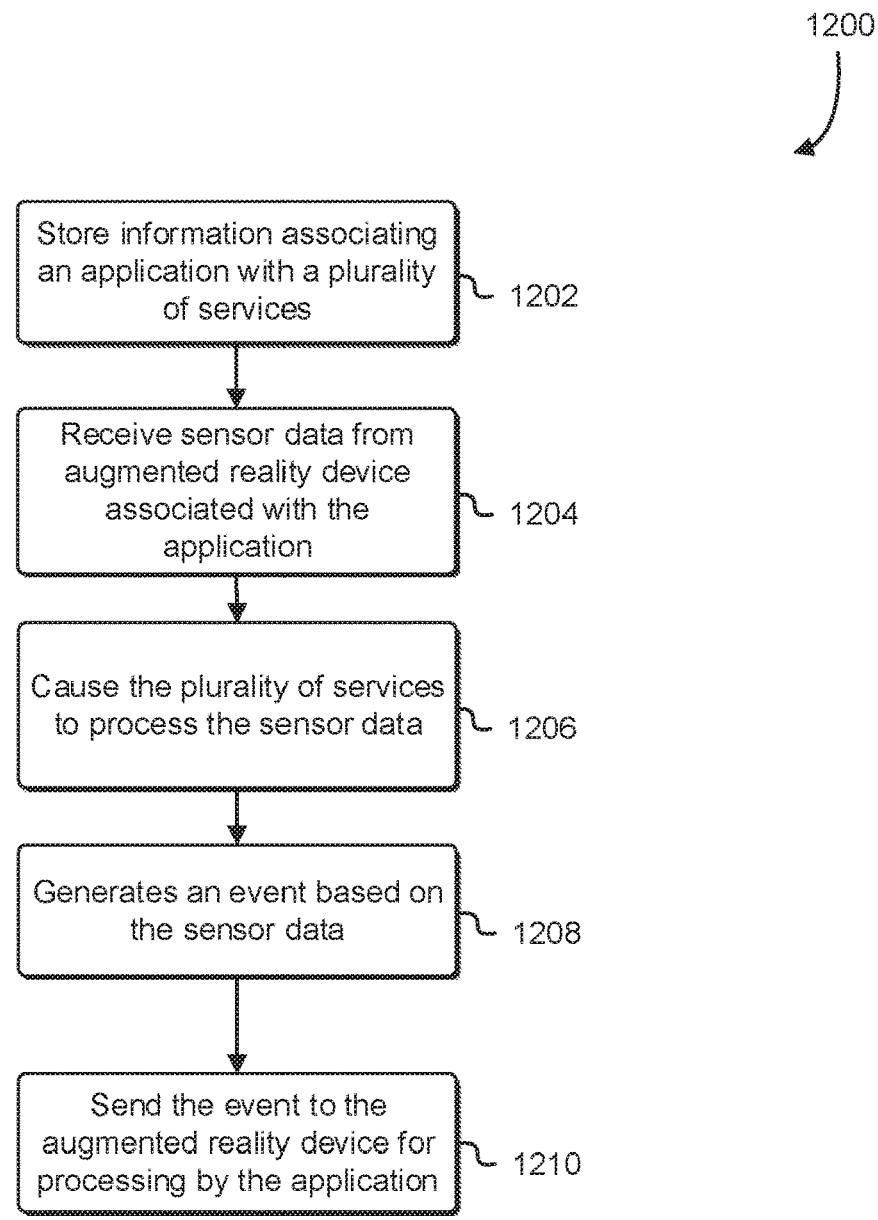
FIG. 12 is a flowchart that illustrates further aspects of example operation of an augmented reality framework, in accordance with an embodiment.

FIG. 12 is a flowchart that illustrates example operation of an augmented reality framework service, in accordance with an embodiment. Some or all of the process 1200 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1200 may be performed by any suitable system, such as a server in a data center, by various components of the environment 1400 described in conjunction with FIG. 14, such as the one or more web servers 1406 or the one or more application servers 1408, by multiple computing devices in a distributed system of a computing resource service provider, or by any electronic client device such as the electronic client device 1402.

The process 1200 includes a series of operations wherein a hosted platform for augmented reality receives and processes events from an augmented reality device, and provides the events to an application executing on an augmented reality device.

At 1202, the platform stores information associating an application with a plurality of hosted services. In embodiments, applications subscribe to specific services. Alternatively, or in combination, services subscribe to applications.

In an embodiment, a system, such as the platform 100 depicted in FIG. 1, stores information comprising a unique identifier of an augmented reality device and a unique identifier of an application or application instance. In embodiments, this data is mapped to a service or set of services to which the instance of the application is subscribed, or vice versa. In an embodiment, the mapping is maintained by a service bus, such as the service bus 122 depicted in FIG. 1.

At 1204, the platform receives sensor data from an augmented reality device associated with the application. For example, with respect to FIG. 1, if a service has subscribed to sensor data from an application, the service bus 122 may receive, via a platform interface 120, sensor data transmitted from an augmented reality device.

The sensor data is provided by an augmented reality device, and may include data such as visual data collected by or derived from a camera, microphone, gyroscope, and so forth.

The augmented reality device may determine to send the sensor data based on a filter. In an embodiment, the augmented reality device determines to send sensor data based on a filter which estimates proximity of an object or event to the augmented reality device, to a portal of an application running on the augmented reality device, or to an object in the augmented reality scene.

At 1206, the platform causes the plurality of services to process the sensor data. In embodiments, the services process the sensor data through an iterative process, where each of a plurality of services is able to examine the original sensor data and/or any observations, conclusions, inferences, or related data derived by the other services.

At 1208, the platform generates an event based on the sensor data. This may be done, for example, by the service bus 122 depicted in FIG. 1. As noted, the service bus 122 may cause the services to iteratively process the data, so as to identify various aspects, occurrences, and predictions associated with the augmented reality scene, such as objects, audio sources, movement, potential collisions, and so on. The output of this process, in embodiments, is one or more events describing the aspects, occurrences, and predictions that have been derived from the sensor data.

At 1210, the platform sends the event to the augmented reality device for processing by the application. The service bus 122 filters the events to identify those relevant to particular applications, and then causes those events to be sent, via the platform interface 120, to an AR device 102*a,b* on which such applications are running.

Figure 13:
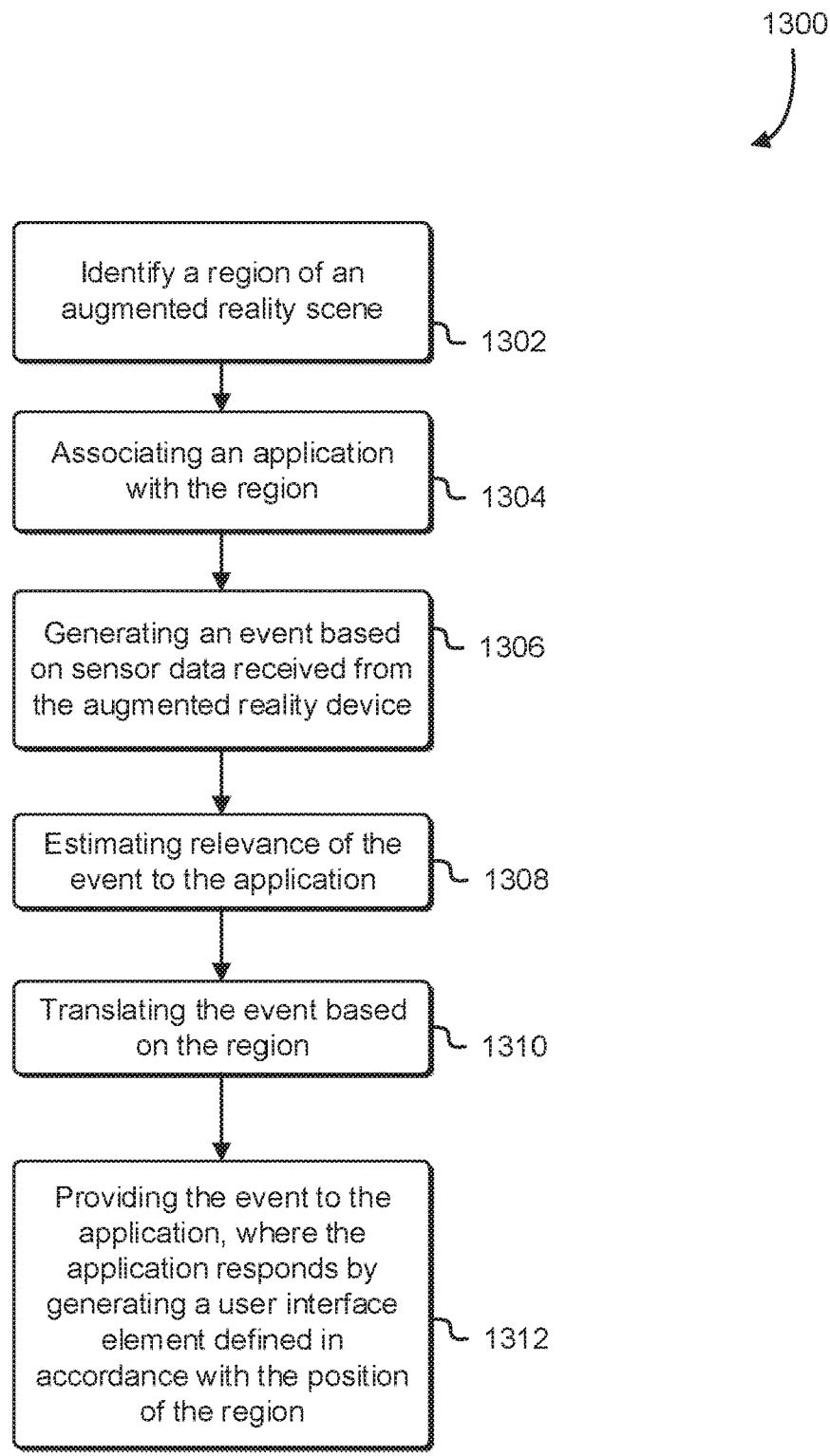
FIG. 13 is a flowchart that illustrates aspects of example operation of an augmented reality framework supporting portal-based applications, in accordance with an embodiment.

FIG. 13 is a flowchart that illustrates aspects of example operation of an augmented reality framework supporting portal-based applications, in accordance with an embodiment. Some or all of the process 1300 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1300 may be performed by any suitable system, such as a server in a data center, by various components of the environment 1400 described in conjunction with FIG. 14, such as the one or more web servers 1406 or the one or more application servers 1408, by multiple computing devices in a distributed system of a computing resource service provider, or by any electronic client device such as the electronic client device 1402.

The process 1300 includes a series of operations wherein a hosted framework for augmented reality receives and processes events from an augmented reality device, and provides the events to a portal-based application executing on an augmented reality device.

At 1302, the platform identifies a region of an augmented reality scene. In an embodiment, a region is identified based on information provided by an application. For example, an application may receive an event identifying an object, and respond to the event by sending a message to the platform to define a portal. In this example, the portal may be defined in relation to the object, e.g. to encompass the object or to be positioned near the object. The portal may be defined in terms of a gravitational point centered on or near the identified object.

In another embodiment, a portal is defined by coordinates relative to the augmented reality device. For example, coordinates may indicate an offset from the current location of the augmented reality device. The portal may also be defined as being projected onto a fixed location in physical space, or as being projected onto a location that is updated as the augmented reality devices moves and/or is reoriented.

At 1304, the platform associates an application with the region. In embodiments, this is done in response to the application defining a portal. The platform interface 120 and/or service bus 122, for example, may respond to an application's definition of a portal by storing information associating the portal's region with the application.

At 1306, the platform generates an event based on sensor data received from an augmented reality device. For example, visual sensor data may be processed to identify an object and compare the proximity of the object to the location of the portal's region. The system might then generate events to indicate that an object has been identified, to indicate the position and direction of the object, and to indicate that the object is moving in a manner which suggests that it may intercept the portal region.

At 1308, the platform estimates the relevance of the event to an application. Embodiments may filter events, or alternatively, selectively generate events, based on the relevance of those events to subscribing applications. For example, applications may register interest in certain categories of events, for events pertaining to certain classes of objects, or for events pertaining to particular people, places, or things. In an embodiment, the service bus 122 filters events and selects an event to send to the subscribing applications.

At 1310, the platform translates the event based on the region. For example, the platform may translate data indicative of the position of objects related to the event to a coordinate system centered on a position within the region. Embodiments may perform further translation or adjustments to account for movement. In embodiments, movement includes a change in the position of the augmented reality device, a change in the orientation of the augmented reality device, and a change in the position of the region. The position of the region may change based on a change in the position or orientation of an object associated with the region. For example, if a region was defined to encompass a person observed in the augmented reality scene, and that person moved, the platform may adjust the position of the region so that the adjusted position of the region still encompasses the person in the scene. An event can be translated based on the adjusted position, so that any objects related to the event are described relative to the updated position of the region.

At 1312, the platform provides the event to the application for processing. The application, in response to the event, generates a user interface element. Generation of the user interface element, in various embodiments, comprises defining or otherwise indicating the positions and sizes of the various components of the user interface. These are specified using coordinates relative to a portal. For example, an application may define a portal to encompass an object in an augmented reality scene, and define a window for display "next to" the portal. The system then assists in the translation of these relative coordinates to a precise location on the display.

FIG. 14 illustrates aspects of an example environment 1400 for implementing aspects in accordance with various embodiments. As will be appreciated, although a web-based environment is used for purposes of explanation, different environments may be used, as appropriate, to implement various embodiments. The environment includes an electronic client device 1402, which can include any appropriate device operable to send and/or receive requests, messages, or information over an appropriate network 1404 and convey information back to a user of the device. Examples of such client devices include personal computers, cell phones, handheld messaging devices, laptop computers, tablet computers, set-top boxes, personal data assistants, embedded computer systems, electronic book readers, and the like.

The environment 1400 in one embodiment is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than those illustrated in FIG. 14. Thus, the depiction in FIG. 14 should be taken as being illustrative in nature and not limiting to the scope of the disclosure.

The network 1404 can include any appropriate network, including an intranet, the Internet, a cellular network, a local area network, a satellite network or any other network, and/or combination thereof. Components used for such a system can depend at least in part upon the type of network and/or environment selected. Many protocols and components for communicating via such network 1404 are well known and will not be discussed in detail. Communication over the network 1404 can be enabled by wired or wireless connections and combinations thereof. In an embodiment, the network 1404 includes the Internet and/or other publicly addressable communications network, as the environment 1400 includes one or more web servers 1406 for receiving requests and serving content in response thereto, although for other networks an alternative device serving a similar purpose could be used as would be apparent to one of ordinary skill in the art.

The illustrative environment 1400 includes one or more application servers 1408 and data storage 1410. It should be understood that there can be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, "servers" may refer to a programming module being executed on a computer system. As used, unless otherwise stated or clear from context, the term "data store" or "data storage" refers to any device or combination of devices capable of storing, accessing, and retrieving data, which may include any combination and number of data servers, databases, data storage devices, and data storage media, in any standard, distributed, virtual, or clustered environment.

The one or more application servers 1408 can include any appropriate hardware, software and firmware for integrating with the data storage 1410 as needed to execute aspects of one or more applications for the electronic client device 1402, handling some or all of the data access and business logic for an application. The one or more application servers 1408 may provide access control services in cooperation with the data storage 1410 and is able to generate content including, text, graphics, audio, video, and/or other content usable to be provided to the user, which may be served to the user by the one or more web servers 1406 in the form of HyperText Markup Language (HTML), Extensible Markup Language (XML), JavaScript, Cascading Style Sheets (CSS), JavaScript Object Notation (JSON), and/or another appropriate client-side structured language. In embodiments, graphical content, such as three-dimensional graphics content, may be transmitted in a binary data format, bitmap, vector graphics representation, compressed and/or uncompressed video frames, and so on. Content transferred to the electronic client device 1402 may be processed by the electronic client device 1402 to provide the content in one or more forms including forms that are perceptible to the user audibly, visually, and/or through other senses. The handling of all requests and responses, as well as the delivery of content between the electronic client device 1402 and the one or more application servers 1408, can be handled by the one or more web servers 1406 using PHP: Hypertext Preprocessor (PHP), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The data storage 1410 can include several separate data tables, databases, data documents, dynamic data storage schemes, and/or other data storage mechanisms and media for storing data relating to a particular aspect of the present disclosure. For example, the data storage 1410 may include mechanisms for storing various types of data and user information 1416, which can be used to serve content to the electronic client device 1402. The data storage 1410 also is shown to include a mechanism for storing log data, such as application logs, system logs, access logs, and/or various other event logs, which can be used for reporting, analysis, or other purposes. It should be understood that there can be many other aspects that may need to be stored in the data storage 1410, such as page image information and access rights information, which can be stored in any of the above listed mechanisms as appropriate or in additional mechanisms in the data storage 1410. The data storage 1410 is operable, through logic associated therewith, to receive instructions from the one or more application servers 1408 and obtain, update, or otherwise process data in response thereto. The one or more application servers 1408 may provide static, dynamic, or a combination of static and dynamic data in response to the received instructions. Dynamic data, such as data used in web logs (blogs), shopping applications, news services, and other applications may be generated by server-side structured languages as described or may be provided by a content management system (CMS) operating on, or under the control of, the one or more application servers 1408.

In one embodiment, a user, through a device operated by the user, can submit a search request for a match to a particular search term. In this embodiment, the data storage 1410 might access the user information to verify the identity of the user and obtain information about items of that type. The information then can be returned to the user, such as in a results listing on a web page that the user is able to view via a browser on the electronic client device 1402. Information related to the particular search term can be viewed in a dedicated page or window of the browser. It should be noted, however, that embodiments of the present disclosure are not necessarily limited to the context of web pages, but may be more generally applicable to processing requests in general, where the requests are not necessarily requests for content.

The various embodiments further can be implemented in a wide variety of operating environments, which in some embodiments can include one or more user computers, computing devices, or processing devices that can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via the network 1404. These devices also can include virtual devices such as virtual machines, hypervisors, and other virtual devices capable of communicating via the network 1404.

Various embodiments of the present disclosure utilize the network 1404 that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), and Common Internet File System (CIFS). The network 1404 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering.

In embodiments utilizing the one or more web servers 1406, the one or more web servers 1406 can run any of a variety of server or mid-tier applications, including Hypertext Transfer Protocol (HTTP) servers, FTP servers, Common Gateway Interface (CGI) servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python, or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment 1400 can include a variety of data stores and other memory and storage media as discussed above. These can reside in a variety of locations, such as on a storage medium local to (and/or resident in) one or more of the computers or remote from any or all of the computers across the network 1404. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit (CPU or processor), an input device (e.g., a mouse, keyboard, controller, touch screen, or keypad), and an output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc Read-Only Memory (CD-ROM), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of 13 and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A system comprising:
    at least one processor; and
    a memory having stored thereon computer-executable instructions that, when executed by the at least one processor, cause the system to:
        store information indicative of an association between a plurality of services and an augmented reality application;
        receive sensor data obtained by an augmented reality device associated with the augmented reality application;
        cause one or more of the plurality of services to process the sensor data;
        obtain an event generated based at least in part on processing of the sensor data by the plurality of services;
        generate an estimate of relevance of the event to the augmented reality application based, at least in part, on proximity between a location associated with the event and a stored location associated with the augmented reality application;
        determine to send the event to the augmented reality application based, at least in part, on the estimate of relevance of the event to the augmented reality application; and
        send the event to the augmented reality application associated with the augmented reality device, wherein an audiovisual interface of the augmented reality application is generated by the augmented reality device based at least in part on the event.

2. The system of claim 1, wherein the estimate of relevance is based at least in part on motion of the object relative to the stored location associated with the augmented reality application.

3. The system of claim 1, wherein the memory has stored thereon computer-executable instructions that, when executed by the at least one processor, cause the system to:
    process the sensor data based at least in part on iterative invocation of the plurality of services.

4. The system of claim 1, wherein at least one of the plurality of services identifies, based at least in part on the sensor data, an object proximate to the augmented reality device.

5. The system of claim 4, wherein at least one of the plurality of services provides information uniquely identifying the object.

6. The system of claim 1, wherein at least one of the plurality of services provides a classification of an object identified in the sensor data.

7. The system of claim 1, wherein the estimate of relevance is based, at least in part, on one or more attributes associated with the augmented reality application.

8. The system of claim 1, wherein the application is associated with a portal associated with region in a physical environment.

9. A computer-implemented method, comprising:
    storing information indicative of an association between an application and a plurality of services associated with the application;
    receiving sensor data obtained by an augmented reality device;
    estimating relevance of the event to the application based, at least in part, on proximity between a location associated with the event and a stored location associated with the application;
    obtaining an event generated based at least in part on processing of the sensor data by the plurality of services, wherein the event is determined to be relevant to the application based, at least in part, on the estimate of relevance of the event to the application; and
    causing the augmented reality device to generate an audiovisual interface for the application, the audiovisual interface based at least in part on the event.

10. The computer-implemented method of claim 9, further comprising:
    identifying, based at least in part on the sensor data, an object proximate to the augmented reality device.

11. The computer-implemented method of claim 10, further comprising:
    determining to provide the event to the application based at least in part on proximity of the object to a point, in three-dimensional space, associated with the application.

12. The computer-implemented method of claim 10, further comprising:
    determining to provide the event to the application based at least in part on motion of the object.

13. The computer-implemented method of claim 9, wherein at least one of the plurality of services determines dimensions of an object proximate to the augmented reality device.

14. The computer-implemented method of claim 9, wherein processing the event comprises iteratively invoking services of the plurality of services, wherein iterative invocation comprises invoking a second service based on output of a first service, and invoking the first service an additional time based on output of the second service.

15. The computer-implemented method of claim 9, wherein the estimate of relevance is based, at least in part, on a location in an augmented reality scene associated with the application.

16. A non-transitory computer-readable storage medium having stored thereon executable instructions that, in response to being executed by one or more processors of an augmented reality device, cause the augmented reality device to at least:
    send a request to register an application with a plurality of remote services;
    obtain sensor data;
    provide the obtained sensor data to the plurality of remote services, wherein the plurality of remote services generates an event based on analysis of the sensor data and the event is sent, to the application, based at least in part on an estimate of relevance of the event to the application, the estimate of relevance based, at least in part, on proximity between a location associated with the event and a stored location associated with the application;

receive the event generated by the plurality of remote services; and generate an audiovisual interface for the application based at least in part on the event.

17. The non-transitory computer-readable storage medium of claim 16, having stored thereon further executable instructions that, in response to being executed by one or more processors of the augmented reality device, cause the augmented reality device to at least:

send, to the one or more services, information indicative of a position and orientation of the augmented reality device.

18. The non-transitory computer-readable storage medium of claim 16, wherein the sensor data comprises a representation of a scene observed by the augmented reality device.

19. The non-transitory computer-readable storage medium of claim 16, wherein generating the audiovisual interface comprises displaying, on a display device, visual data based at least in part on the event.

20. The non-transitory computer-readable storage medium of claim 16, having stored thereon further executable instructions that, in response to being executed by one or more processors of the augmented reality device, cause the augmented reality device to provide the event to application code executing on the augmented reality device.

* * * * *